(12) United States Patent
Tseng et al.

(10) Patent No.: US 10,427,344 B1
(45) Date of Patent: Oct. 1, 2019

(54) MOLDING SYSTEM FOR PREPARING AN INJECTION MOLDED FIBER REINFORCED COMPOSITE ARTICLE

(71) Applicant: CORETECH SYSTEM CO., LTD., Chupei, Hsinchu County (TW)

(72) Inventors: Huan-Chang Tseng, Chupei (TW); Rong-Yeu Chang, Chupei (TW); Chia-Hsiang Hsu, Chupei (TW)

(73) Assignee: Coretech System Co., Ltd., Chupei, Hsinchu County (TW)

( * ) Notice: Subject to any disclaimer, the term of this patent is extended or adjusted under 35 U.S.C. 154(b) by 0 days.

(21) Appl. No.: 16/389,616

(22) Filed: Apr. 19, 2019

(51) Int. Cl.
| | | |
|---|---|---|
| *B29C 45/76* | (2006.01) | |
| *B29C 45/00* | (2006.01) | |
| *G06F 17/50* | (2006.01) | |
| *B29K 105/12* | (2006.01) | |

(52) U.S. Cl.
CPC ...... *B29C 45/7693* (2013.01); *B29C 45/0005* (2013.01); *G06F 17/5009* (2013.01); *B29C 2945/7605* (2013.01); *B29K 2105/12* (2013.01); *G05B 2219/35044* (2013.01); *G05B 2219/45244* (2013.01)

(58) Field of Classification Search
CPC .......... A23N 12/02; B08B 3/102; B08B 3/02; B08B 3/08; A23L 5/276; A23L 5/57; G05B 2219/35044; G05B 2219/45244; A23V 2002/00
See application file for complete search history.

(56) References Cited

U.S. PATENT DOCUMENTS

| | | | |
|---|---|---|---|
| 7,266,469 B1 * | 9/2007 | Tucker, III | G01C 1/00 361/225 |
| 8,571,828 B2 | 10/2013 | Tseng et al. | |
| 8,768,662 B2 | 7/2014 | Chang et al. | |
| 9,283,695 B1 * | 3/2016 | Tseng | B29C 45/7693 |
| 9,573,307 B1 | 2/2017 | Tseng et al. | |
| 9,862,133 B1 | 1/2018 | Tseng et al. | |

(Continued)

OTHER PUBLICATIONS

Tseng et al., Phenomenological improvements to predictive models of fiber orientation in concentrated suspensions, J. Rheol., 57 (2013) 36 pages.

(Continued)

*Primary Examiner* — Christopher E. Everett
(74) *Attorney, Agent, or Firm* — Muncy, Geissler, Olds & Lowe, P.C.

(57) ABSTRACT

A molding system includes a mold having a mold cavity; a molding machine configured to fill the mold cavity with a composite molding resin including a polymeric material having a plurality of fibers; a processing module connected to the molding machine; and a controller connected to the computing apparatus. The processing module includes a processor configured to generate an orientation distribution of the fibers in the mold cavity based on a molding condition for the molding machine, wherein the orientation distribution is generated taking into consideration a combined effect of a molding pressure and a shear rate on a zero-shear-rate viscosity of the composite molding material. The controller is configured to control the molding machine to perform an actual molding with the molding condition for injecting the composite molding resin into at least a portion of the mold cavity.

5 Claims, 21 Drawing Sheets

(56) References Cited

U.S. PATENT DOCUMENTS

2010/0169062 A1* 7/2010 Linn .................. B29C 45/7693
                                                    703/2
2019/0176383 A1* 6/2019 Lu ..................... B29C 45/7693

OTHER PUBLICATIONS

Tseng et al., An objective tensor to predict anisotropic fiber orientation in concentrated suspensions, J. Rheol., 60 (2016) 215, 11 pages.

M.M. Cross, Relation between viscoelasticity and shear-thinning behaviour in liquids, Rheol. Acta 18, 609-614 (1979), 6 pages.

Chang et al., Numerical simulation of mold filling in injection molding using a three-dimensional finite volume approach, International Journal for Numerical Methods in Fluids vol. 37, Issue 2, pp. 125-148, Sep. 30, 2001, 24 pages.

Tseng et al., Improved fiber orientation predictions for injection molded fober composites, Composites Part A: Applied Science and Manufacturing 2017; 99, 65-75, 11 pages.

* cited by examiner

MOLDING SYSTEM FOR PREPARING AN INJECTION MOLDED FIBER REINFORCED COMPOSITE ARTICLE

TECHNICAL FIELD

The present disclosure relates to a molding system for preparing an injection molded fiber-reinforced composite article using a computer-aided engineering (CAE) simulation.

DISCUSSION OF THE BACKGROUND

Fiber-reinforced thermoplastic (FRT) composites, produced by molding techniques such as injection molding, greatly reduce assembly costs and vehicle weight. Use of FRTs to replace metals continues to show strong growth in automotive industrial products so as to improve specific properties, including tensile strength, thermal expansion, electrical conductivity, and water penetrability. More importantly, these properties are strongly dependent on fiber orientation states. However, fiber orientation behavior regarding the plurality of fibers immersed in a polymeric matrix flowing through a filling mold of an injection process is very complex. Therefore, the model for describing orientation states of fibers is of great importance.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a molding system for preparing an injection-molded fiber-reinforced composite article. In some embodiments, the molding system comprises: a mold having a mold cavity; a molding machine configured to fill the mold cavity with a composite molding resin including a polymeric material having a plurality of fibers; a processing module connected to the molding machine, wherein the processing module is configured to generate an orientation distribution of the fibers in the mold cavity based on a molding condition for the molding machine, wherein the orientation distribution is generated taking into consideration a combined effect of a molding pressure and a shear rate on a zero-shear-rate viscosity of the composite molding material; and a controller connected to the processing module and configured to control the molding machine with the molding condition to perform an actual molding for injecting the composite molding resin into at least a portion of the mold cavity.

In some embodiments, the combined effect includes a non-linear multiplying effect of the shear rate on the molding pressure.

In some embodiments, the combined effect is non-linear along a direction perpendicular to a flow direction of the composite molding resin in the mold cavity.

In some embodiments, the combined effect is represented using an expression:

$$\eta_0(T, P, \dot{\gamma}) = D_1 \exp\left(\frac{A_1 D_2 - A_1 T}{\tilde{A}_2 - D_2 + T}\right) \exp\left(\frac{A_1}{\tilde{A}_2 - D_2 + T} D_3(\dot{\gamma})P\right)$$

where $\eta_0(T, P, \dot{\gamma})$ represents zero-shear-rate viscosity, $\dot{\gamma}$ represents shear rate, P represents molding pressure, T represents molding temperature, $A_1$, $A_2$, $D_1$, $D_2$, $\tilde{A}_2$ represent constants, and $D_3(\dot{\gamma})$ represents a variable depending on the shear rate.

In some embodiments, $D_3(\dot{\gamma})$ is represented by an expression:

$$D_3(\dot{\gamma}) = D_3^0\left(1 + \frac{N_3 - 1}{1 + \left(\frac{\dot{\gamma}}{\dot{\gamma}_c}\right)^{n_3}}\right),$$

$$D_3^* = 1 + \frac{N_3 - 1}{1 + (\dot{\gamma}^*)^{n_3}},$$

$$D_3^* = \frac{D_3}{D_3^0}, \dot{\gamma}^* = \frac{\dot{\gamma}}{\dot{\gamma}_c},$$

where $D_3^0$, $\dot{\gamma}_3$, $N_3$ and $n_3$ represent constants, $D_3^*$ represents a reduced pressure parameter, and $\dot{\gamma}^*$ represents a reduced shear rate.

The mechanical properties of the molded article are correlated with the orientation distribution of the fibers. If the simulated orientation distribution of the fibers with the corresponding mechanical properties does not meet the specification of the molded FRT article, the fiber parameters or the molding condition may be adjusted, and another simulation is performed to obtain an updated orientation distribution of the fibers in the composite molding resin while using the adjusted fiber parameter or the molding condition. To obtain the orientation distribution of the fibers in the composite molding resin injected into the mold cavity, the present disclosure generates the rotary diffusion distribution of the fibers based on the previous orientation distribution of the fibers, and generates the updated orientation distribution of the fibers based on the rotary diffusion distribution of the fibers. Consequently, the present disclosure can accurately and efficiently predict the orientation distribution of the fibers in the composite molding resin and the mechanical properties of the molded FRT article.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

Figure 1:
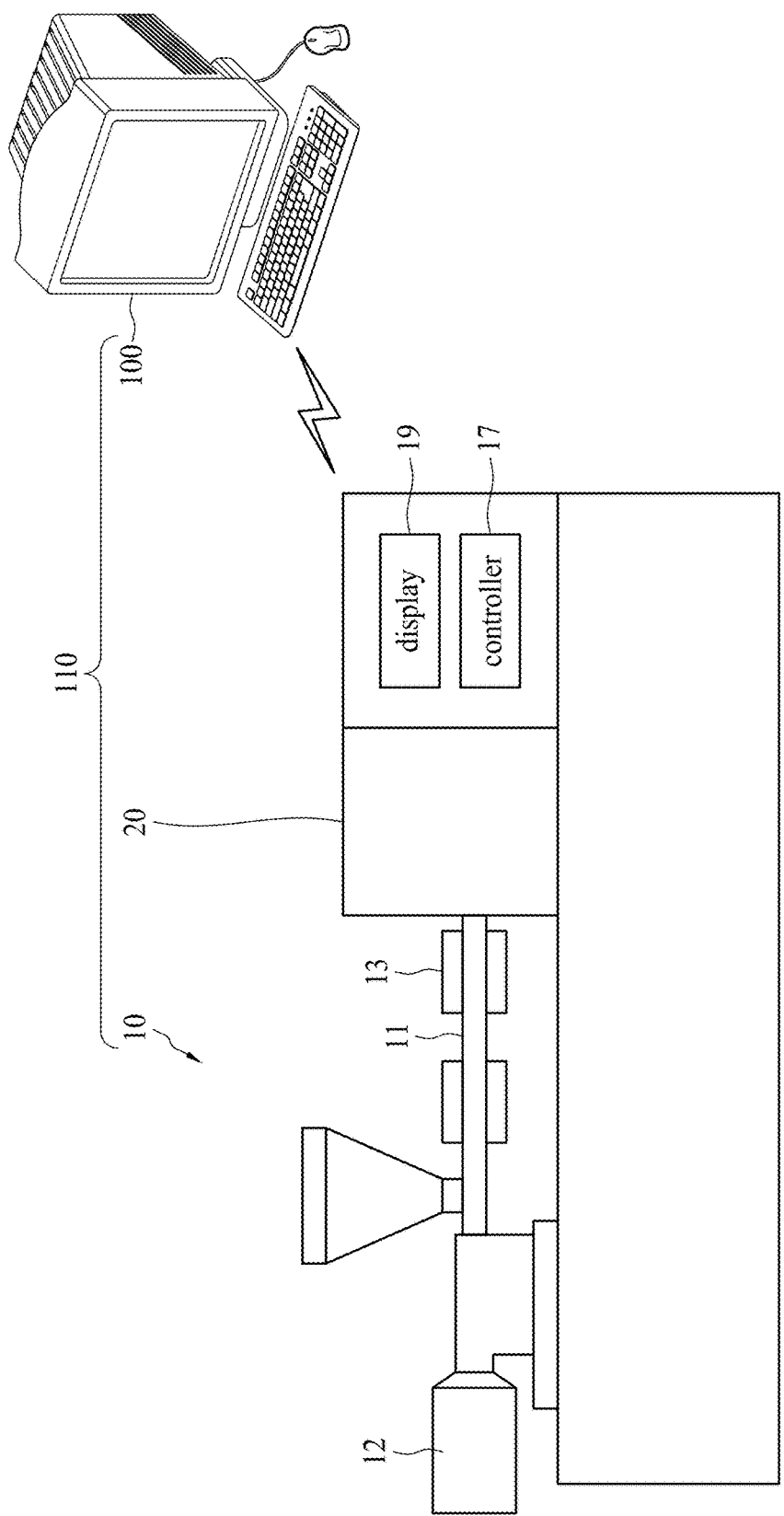
FIG. 1 is a schematic view of an injection molding system in accordance with various embodiments of the present disclosure.

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system for preparing an injection-molded fiber-reinforced composite article using a computer-aided engineering (CAE) simulation. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Injection molding is a technology commonly used for high-volume manufacturing of parts made of synthetic resin, most commonly made of thermoplastic polymers. During a repetitive injection molding process, a plastic resin, most often in the form of small beads or pellets, is introduced to an injection molding machine that melts the resin beads under heat, pressure, and shear. The now-molten resin is forcefully injected into a mold cavity having a particular cavity shape. The injected plastic is held under pressure in the mold cavity, cooled, and then removed as a solidified part having a shape that essentially duplicates the cavity shape of the mold.

A typical injection molding procedure comprises four basic operations: (1) heating the plastic resin in the injection molding machine to allow it to flow under pressure; (2) injecting the melted plastic resin into a mold cavity or cavities defined between two mold halves that have been closed; (3) allowing the plastic resin to cool and harden in the cavity or cavities while under pressure; and (4) opening the mold halves to cause the cooled part to be ejected from the mold. In the conventional injection molding of synthetic resin by an injection molding machine, the weight of the injected synthetic resin varies with the molten resin pressure, the molten resin specific volume, the molten resin temperature and other molten resin conditions. Therefore, it is difficult to form products of a consistent quality.

In general, the setting of molding conditions of the injection molding machine requires a large number of trial molding operations and a lengthy setting time because the setting work greatly depends on the know-how and experience of an operator of the injection molding machine, and various physical values affect one another as well.

Therefore, a virtual molding, i.e., a computer-implemented simulation, using CAE (Computer-Assisted Engineering) is performed for the injection molding, and the molding conditions are then set based on the virtual molding. In virtual molding using CAE, phenomena occur in a mold cavity within a short period of time, and therefore the results of simulation of resin temperature, pressure, shear rate, etc. can be reflected in molded products. Therefore, if the molding phenomena occurring within a mold cavity can be accurately predicted, use of CAE may enable optimization of molding conditions and stable molding of non-defective products.

Figure 2:
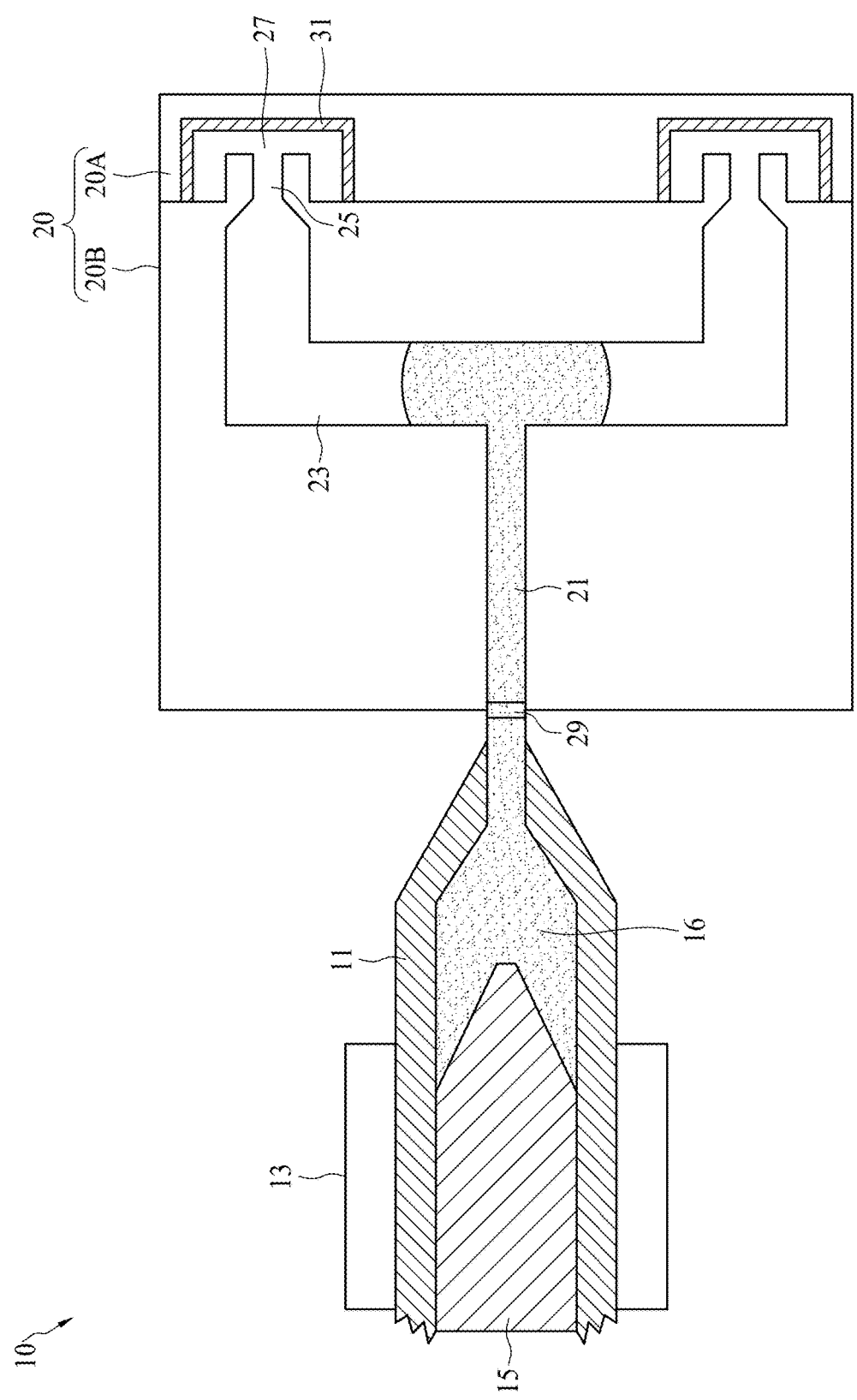
FIG. 2 is a close-up schematic view of the mold in FIG. 1.

FIG. 1 is a schematic view of an injection molding system 110 in accordance with various embodiments of the present disclosure, and FIG. 2 is a close-up schematic view of a mold 20 and a barrel 11 in FIG. 1. The injection molding system 110 comprises a molding machine 10 such as an injection molding machine, the mold 20 disposed on the molding machine 10, and a computing apparatus 100 connected to the injection molding machine 10. In some embodiments of the present disclosure, the injection molding machine 10 includes the barrel 11 having a screw chamber, heating elements 13 configured to heat the screw chamber of the barrel 11, and a screw 15 positioned in the screw chamber of the barrel 11 and driven by a screw-driving motor 12 for feeding a composite molding resin 16, such as thermoplastics with fibers, into a mold cavity 27 of the metal mold 20. In some embodiments of the present disclosure, the injection molding system 110 has a controller 17 configured to control the operation of the injection molding machine 10, and a display 19 configured to display information of the injection molding process. In some embodiments of the present disclosure, the controller 17 and the computing apparatus 100 implement a controlling module of the injection molding system 110.

In some embodiments of the present disclosure, the injection molding machine 10 is equipped with sensors for sensing the velocity of the screw 15, the pressure of the barrel 11 (the filling pressure in the filling stage and the packing pressure in the packing stage) and the temperature of the barrel 11 (the filling temperature in the filling stage and the packing temperature in the packing stage); and the computing apparatus 100 is programmed to acquire the velocity and pressure data from the controller 17 through the association therebetween.

The metal mold 20 is comprised of a fixed-side metal mold 20A and a movable-side metal mold 20B. Inside the metal mold 20, a sprue portion 21, a runner portion 23, a gate portion 25 and a mold cavity 27 are formed so as to be arranged in the above-mentioned order from the injection molding machine 10. The sprue portion 21 of the metal mold 20 is connected to the barrel 11 of the molding machine 10 via a nozzle 29.

The injection molding technique uses conventional rapid automated molding equipment, and short/long fiber reinforced thermoplastic (SFRT/LFRT) production is applied using the injection process. In the injection molding process, the additional fiber-filled polymer/resin melts (fibers in a matrix) are transported as a suspension into the mold cavity 27. To design molded FRT articles effectively, the influence of flow-induced fiber orientation distribution on the mechanical properties of the finished molding product, such as the strength of the finished molding product, must be considered.

FRT composites are generally grouped into two categories based on fiber length: short fiber-reinforced thermoplastics or SFRTs, with fiber length less than 1.0 mm, and long fiber-reinforced thermoplastics or LFRTs, having fiber length greater than 1.0 mm. Unlike SFRTs, LFRTs can yield continuous-fiber reinforcement. LFRT pellets are more extensively employed in automotive industrial fabrication than SFRT pellets.

Figure 3:
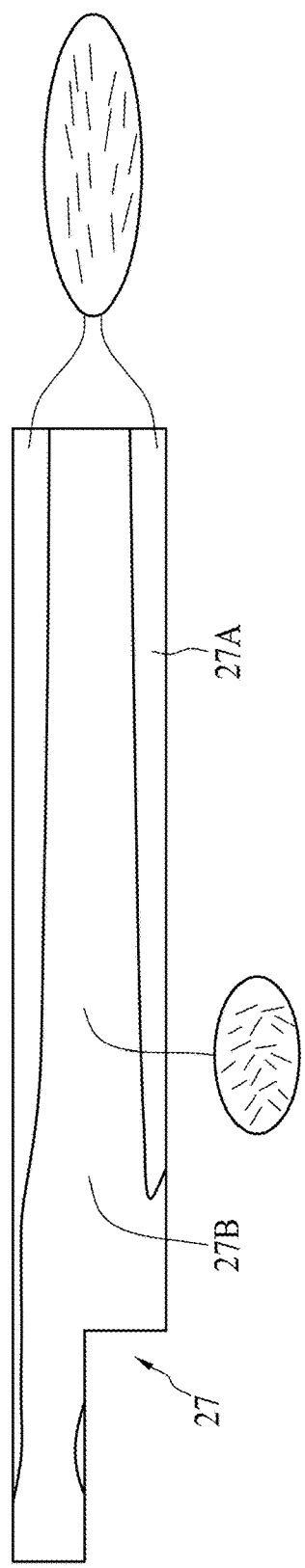
FIG. 3 illustrates the orientation of the fibers filled into the mold cavity in FIG. 2.

FIG. 3 illustrates the orientation of a composite molding resin (including a polymeric material having a plurality of fibers) filled into the mold cavity 27 in FIG. 2. The most noticeable feature of the filling is the existence of shell layers 27A and a core region 27B across the thickness of the molded cavity 27. The fibers found in the shell layers 27A (near the cavity wall) are strongly aligned in the flow direction, but the fibers in the core region 27B (near the cavity center) are transverse to the flow. Hence, it is necessary to understand how the fiber orientation varies during the mold filling and the subsequent packing stages. In some embodiments of the present disclosure, the polymeric material is PP (Polypropylene), PBT (Polybutylene terephthalate), nylon, or PC (Polycarbonate), the fibers are glass fibers or carbon fiber, and the fiber concentration in the polymeric material is between 10 wt % and 60 wt %.

Theoretical research of fiber orientations is significant in the field of suspension rheology. The classical hydrodynamic model for a single axisymmetric fiber was proposed by the pioneer Jeffery. Folgar and Tucker modified Jeffery's model to include fiber-fiber interactions in semi-concentrated suspensions, and the modified model has been widely used to predict flow-induced fiber orientation patterns in injection-molded FRT articles. Significantly, both objective models of fiber orientation were recently developed based on suspension rheology, namely, RSC (Reduced Strain Closure) and iARD-RPR (Improved Anisotropic Rotary Diffusion and Retarding Principal Rate). The state-of-the-art predictive engineering tools of injection molding simulations, the Autodesk Simulation Moldflow Insight (ASMI) and the Moldex3D (CoreTech System Co. of Taiwan), have incorporated the RSC model and the iARD-RPR model, respectively, to provide predictions of fiber orientation.

Accurate orientation predictions of the modern RSC and iARD-RPR models are primary requirements in a complete simulation, from injection molding to structural analysis. However, some studies have found weaknesses and flaws in RSC and iARD-RPR, with significant deviation found in the core region, although the orientation in the shell layer was predicted fairly well. This is a long-running problem with leading predictive engineering tools.

Regarding this issue, an ASMI team provided an available function, "the 3D inlet condition of fiber orientation set around a gate area," to improve fiber orientation predictions using the RSC model in 3D-mesh analysis. Wang, et al. and Nguyen, et al. examined a new research version of the ASMI Fiber solver with the 3D inlet gate condition of fiber orientation distribution, supporting the user-defined model (if possessing experimental data) and the specified model (artificially, to define aligned orientation at the skin and transverse/random orientation at the core). It is worth noting that both research teams pointed out that the inlet condition strongly influences the prediction of the RSC model and the ARD-RSC model. As a result, the good orientation predictions of long carbon fibers were achieved by comparing the midplane-mesh and 3D-mesh simulations with relevant experimental data.

Recently, the inventors of the present disclosure proposed an iARD-RPR model including three parts (See, U.S. Pat. No. 8,571,828; H.-C. Tseng, R.-Y. Chang, C.-H. Hsu, Phenomenological improvements to predictive models of fiber orientation in concentrated suspensions, J. Rheol., 57 (2013) 1597; H.-C. Tseng, R.-Y. Chang, C.-H. Hsu, An objective tensor to predict anisotropic fiber orientation in concentrated suspensions, J. Rheol., 60 (2016) 215; the entirety of which are incorporated herein by reference).

Figure 4:
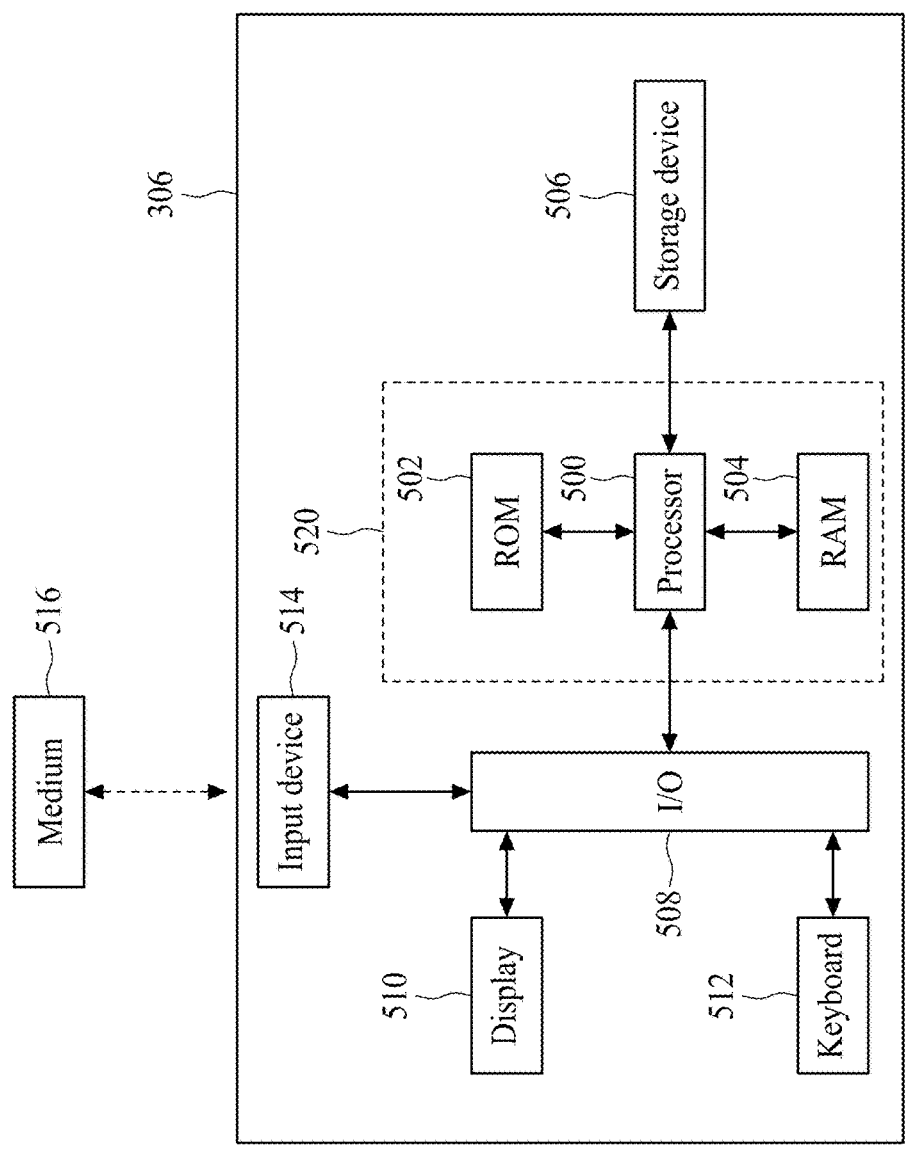
FIG. 4 is a functional block diagram of a computing apparatus in accordance with some embodiments of the present disclosure.

FIG. 4 is a functional block diagram of the computing apparatus 306 in accordance with some embodiments of the present disclosure. The computing apparatus 306 comprises a processing module 520 for executing CAE simulation software. In some embodiments of the present disclosure, the processing module 520 includes a processor 500, a read-only memory (ROM) 502, and a random access memory (RAM) 504. In some embodiments of the present disclosure, the computing apparatus 306 further comprises a storage device 506 and an input/output (I/O) interface 508.

The processor 500 operably communicates with the ROM 502, the RAM 504, the storage device 506, and the I/O interface 508.

In some embodiments of the present disclosure, the computing apparatus 306 may further include a keyboard 512 and an input device 514, such as a card reader or an optical disk drive. The input device 514 is configured to input computer instructions (software algorithms) stored in a non-transitory computer-readable medium 516, and the processor 500 is configured to execute the computer instructions for performing the CAE molding simulation operations according to the computer instructions. For example, the computer instructions include steps of CAE molding simulation operations.

In some embodiments of the present disclosure, the processor 500 reads the software algorithms from the input device 514 or the storage device 506, executes the steps of CAE molding simulation operations, and stores the simulation result in the RAM 504. In some embodiments of the present disclosure, the memory devices, i.e., the ROM 502 and the RAM 504, can be programmed to store codes for performing the CAE molding simulation operations.

Figure 5:
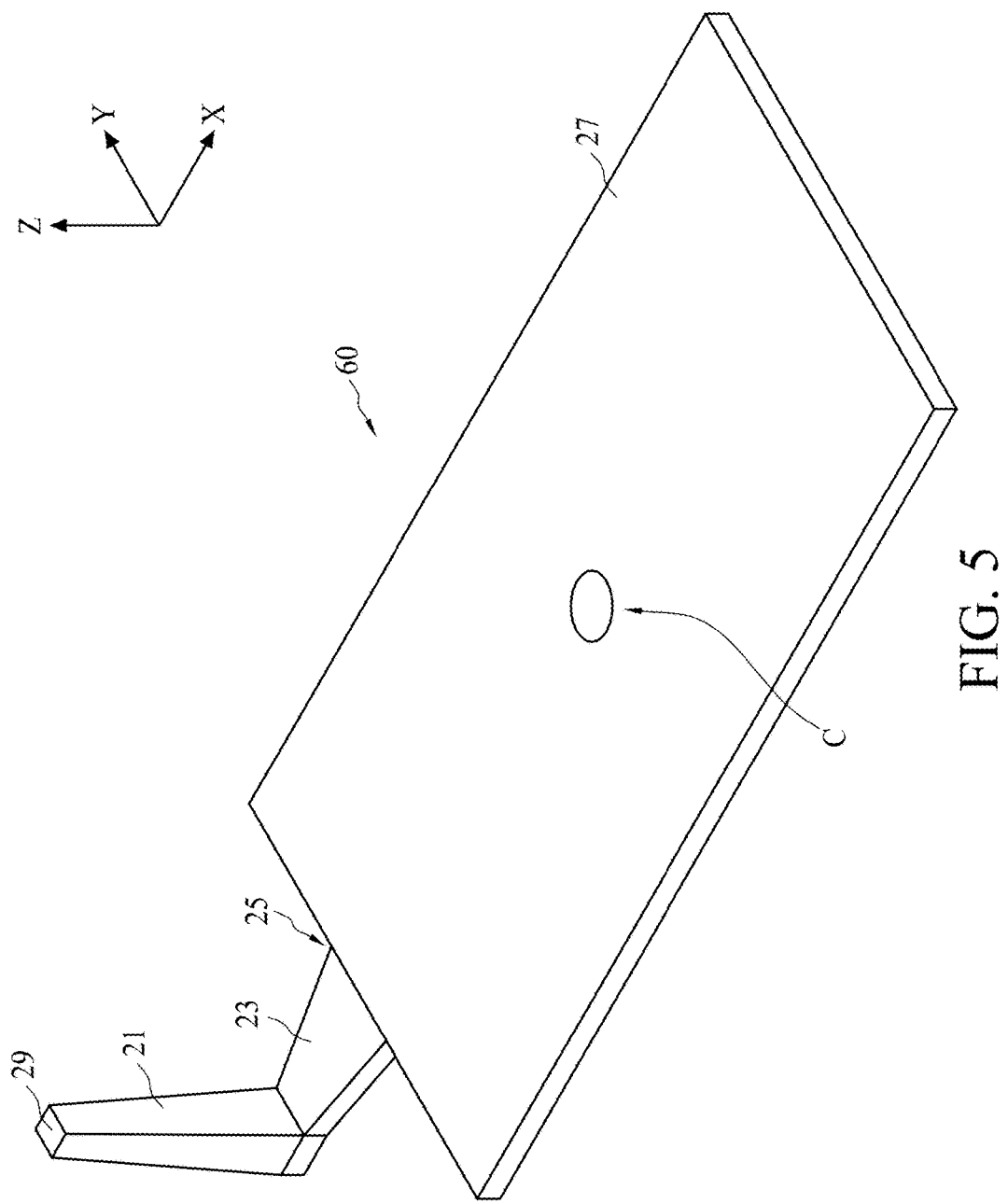
FIG. 5 shows a genuine domain of an FRT composite article with an end-gated plate geometry.

FIG. 5 is a schematic view of a genuine domain 60 of an FRT composite article with an end-gated plate geometry in accordance with some embodiments of the present disclosure. Referring back to FIG. 2, the metal mold 20 may be divided into two parts: a metal part and a space part defined by the metal part. The genuine domain 60 is an example of the space part of the metal mold 20.

Figure 6:
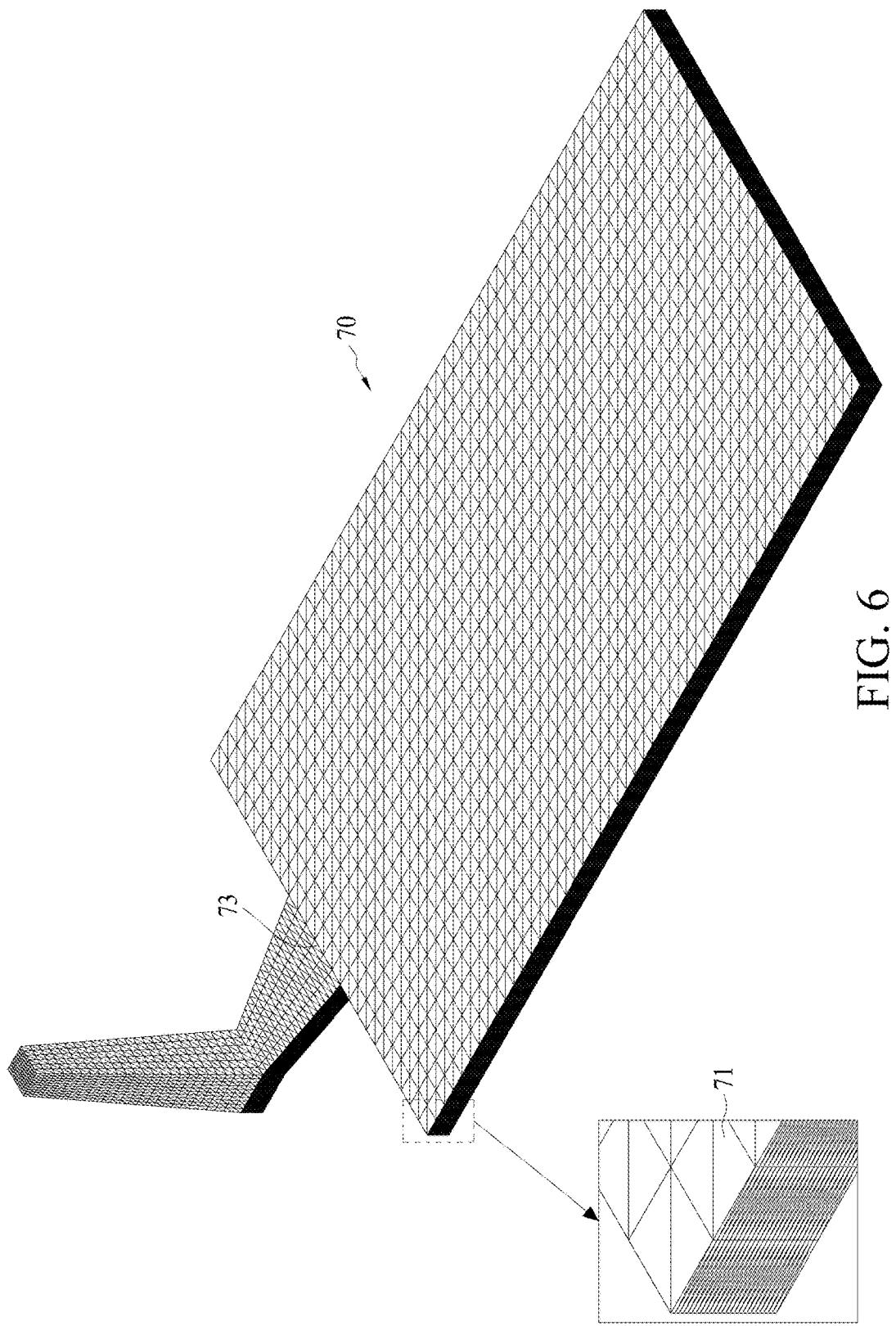
FIG. 6 is a schematic view of a simulating domain corresponding to the genuine domain in FIG. 5 in accordance with some embodiments of the present disclosure.

FIG. 6 is a schematic view of a simulating domain 70 corresponding to the genuine domain 60 in FIG. 5 in accordance with some embodiments of the present disclosure. In some embodiments of the present disclosure, a mesh is created by dividing at least part of the simulating domain 70 before actually applying a numerical analysis, such as an FEM (finite element method), an FDM (finite difference method) or an FVM (finite volume method), to the simulating domain 70. The creation of the mesh for the simulating domain 70 uses a technique of modeling an object or fluid (composite molding resin) region (i.e., the simulating domain 70 of the present embodiment) to be analyzed with a set of elements 71, such as rectangular mesh, hexahedral mesh or tetrahedral mesh, in order to perform the subsequent numerical analysis. In some embodiments of the present disclosure, the simulating domain is obtained from a CAD (Computer Aided Design) model used in design and development of a product.

After specifying the simulation domain 70, the processor 101 is executed to generate a shear rate distribution of the composite molding resin in the simulating domain 70. A virtual molding process is performed to simulate a molding process of the composite molding resin that is injected into the simulating domain 70 while using a molding condition for the molding machine, wherein the molding condition includes the mold temperature, resin temperature, injection pressure, injection time (or speed), packing pressure, packing time, etc.

Figure 7:
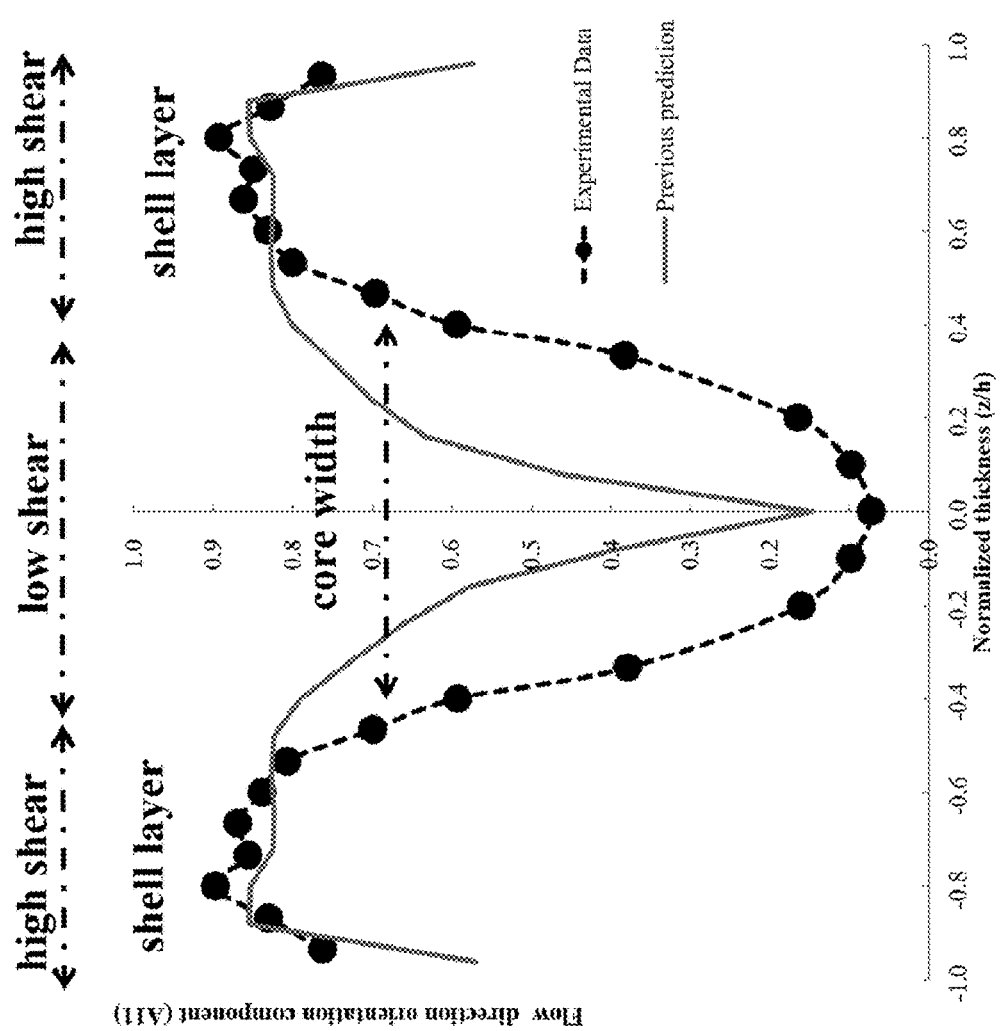
FIG. 7 shows the well-known shell-core structure found in experimental flow-direction orientation tensor (A11) component across the thickness of the molded part.

FIG. 7 shows that the well-known shell-core structure is found in the experimental flow-direction orientation tensor (A11) component across the thickness of the molded part. In order to manufacture safer and stronger FRT products, a trend to use higher fiber concentrations or greater fiber lengths has recently emerged in the automotive, aerospace and energy industries. Greater core widths are generally applied in such processes. However, there is a long-running problem requiring an urgent solution for the industry: to date, prior state-of-the-art predictive engineering tools have always provided unsatisfactory results pertaining to the narrow core.

In injection molding simulations, the governing equations of fluid mechanics (See, Bird R B, Armstrong R C, Hassager O. Fluid mechanics. 2nd ed. New York: Wiley-Interscience, 1987.), which describe the transient and non-isothermal flow motion are as follows:

$$\frac{\partial \rho}{\partial t} + \nabla \cdot \rho u = 0 \tag{1}$$

$$\frac{\partial}{\partial t}(\rho u) + \nabla \cdot (\rho u u - \sigma) = \rho g \tag{2}$$

$$\sigma = -pI + \eta(\nabla u + \nabla u^T) \tag{3}$$

$$\rho C_P\left(\frac{\partial T}{\partial t} + u \cdot \nabla T\right) = \nabla \cdot (k \nabla T) + \eta \dot{\gamma}^2 \tag{4}$$

where ρ represents density; u represents the velocity vector; t represents time; σ represents the total stress tensor; g represents the acceleration vector of gravity; p represents pressure; η represents viscosity; $C_p$ represents specific heat; T represents temperature; k represents thermal conductivity; and $\dot{\gamma}$ represents shear rate. The flow curves of shear viscosity reflect the flow behaviors of a variety of materials. Commonly, the well-known Cross-William-Landel-Ferry (Cross-WLF) model (See, Cross MM. Relation between viscoelasticity and shear-thinning behaviour in liquids. Rheol Acta 1979; 18(5) 609-614.) used in polymer rheology and processing simulations can describe complex viscosity behaviors, including the variation of viscosity with shear rate for the Cross model, and the dependence of zero-shear-rate viscosity on temperature and pressure for the WLF model:

$$\eta(\dot{\gamma}, T, P) = \frac{\eta_0(T, P)}{1 + \left(\frac{\eta_0 \dot{\gamma}}{\tau^*}\right)^{1-n}} \tag{5}$$

$$\eta_0(T, P) = D_1 \exp\left(\frac{-A_1(T - T_c)}{A_2 + (T - T_c)}\right) \tag{6}$$

$$T_c = D_2 + D_3 P \tag{7}$$

$$A_2 = \tilde{A}_2 + D_3 P \tag{8}$$

$$\eta_0(T, P, \dot{\gamma}) = D_1 \exp\left(\frac{A_1 D_2 - A_1 T}{\tilde{A}_2 - D_2 + T}\right) \exp\left(\frac{A_1}{\tilde{A}_2 - D_2 + T} D_3(\dot{\gamma}) P\right) \tag{9}$$

where seven parameters are set according to related experimental data, including n, τ*, $A_1$, $\tilde{A}_2$, $D_1$, $D_2$ and $D_3$.

Solving the governing equations requires a transient state analysis, which can be performed numerically using a computer. See, for example, R-Y Chang and W-H Yang, "Numerical simulation of mold filling in injection molding using a three-dimensional finite volume approach," International Journal for Numerical Methods in Fluids Volume 37, Issue 2, pages 125-148, Sep. 30, 2001, the entirety of which is incorporated herein by reference. During the transient state analysis, the process variables that change with time are not zero; i.e., the partial derivatives (∂/∂t) in the governing equations are not considered zero.

Flow-induced fiber orientation distribution defines the core-shell structure shown in FIG. 1. The fibers found in the shell region near the cavity are strongly aligned with the flow direction over a high-shear-rate range, as opposed to the fibers found in the core region near the cavity center, which are transverse to the flow over a low-shear-rate range. In particular, it is obvious to exhibit a broad core for long fiber length or high fiber concentration. The flow behavior of a fluid depends on shear viscosity. Thus, the core width of fiber orientation distribution should be related to a low-shear-rate shear viscosity.

Figure 8:
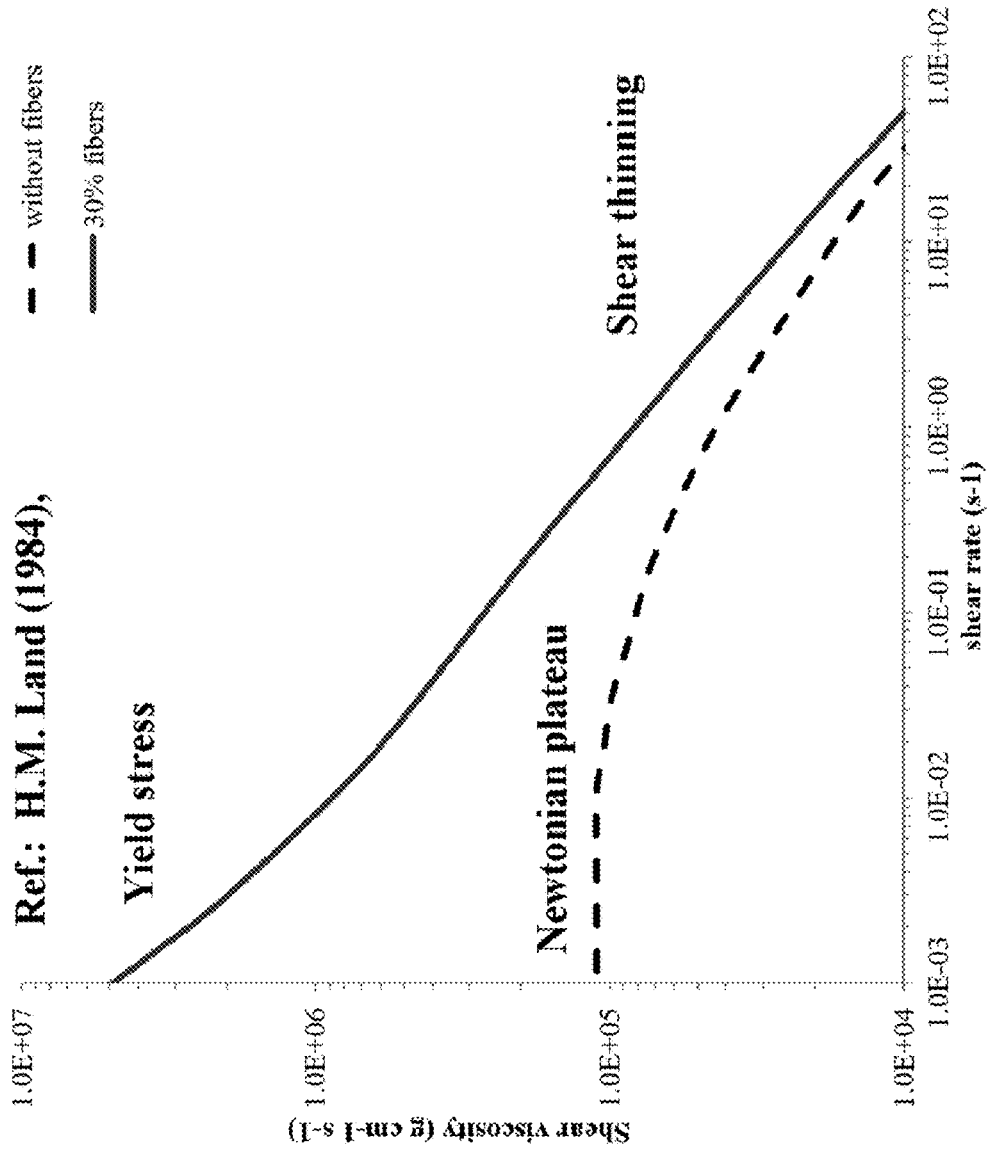
FIG. 8 shows the experimental occurrence of the yield stress at low shear rates for the 30 wt % glass-fiber/LDPE composites, while a pure polymer without fibers possesses the Newtonian plateau at low shear rates.

From literature regarding fiber suspension rheology (See, Laun H M. Orientation effects and rheology of short glass fiber-reinforced thermoplastics. Colloid Polym Sci 1984; 262(4) 257-269. And Thomasset J, Carreau P J, Sanschagrin B, Ausias G. Rheological properties of long glass fiber filled polypropylene. J Non-Newtonian Fluid Mech 2005; 125 25-34.) on fiber suspension rheology, FIG. 8 shows the experimental occurrence of the yield stress at low shear rates for the 30 wt % glass-fiber/LDPE composites, while a pure polymer without fibers exhibits the Newtonian plateau at low shear rates. Thus, the nature of yield stress is shown in the concentrated fiber suspension rheology.

In accordance with insights derived from experimental results related to fiber suspension viscosity, the previous invention of Tseng, et al. (See, Tseng H-C, Chang R-Y, Hsu C-H. Improved fiber orientation predictions for injection molded fiber composites. Composites Part A: Applied Science and Manufacturing 2017; 99 65-75. And Tseng H-C, Chang R-Y, Hsu C-H. Method for preparing a fiber-reinforced composite article by using computer-aided engineering. U.S. Pat. No. 9,573,307B1; 2017.) proposed that the yield-stress viscosity does exist at low shear rates. The previous invention of Tseng, et al. introduces the yield stress term $\tau_y(T)$ to modify the standard Cross-WLF viscosity model, namely the Yield-Cross-WLF, as follows:

$$\eta(\dot{\gamma}, T, P) = \frac{\tau_Y}{\dot{\gamma}} + \frac{\eta_0(T, P)}{1 + \left(\frac{\eta_0 \dot{\gamma}}{\tau^*}\right)^{1-n}} \quad (10)$$

$$\tau_Y(T) = \tau_{Y0} \exp\left(\frac{T_Y}{T}\right) \quad (11)$$

where $\tau_{y0}$ represents reference yield stress, $T_y$ represents a characteristic temperature, and T represents the absolute temperature.

Figure 9:
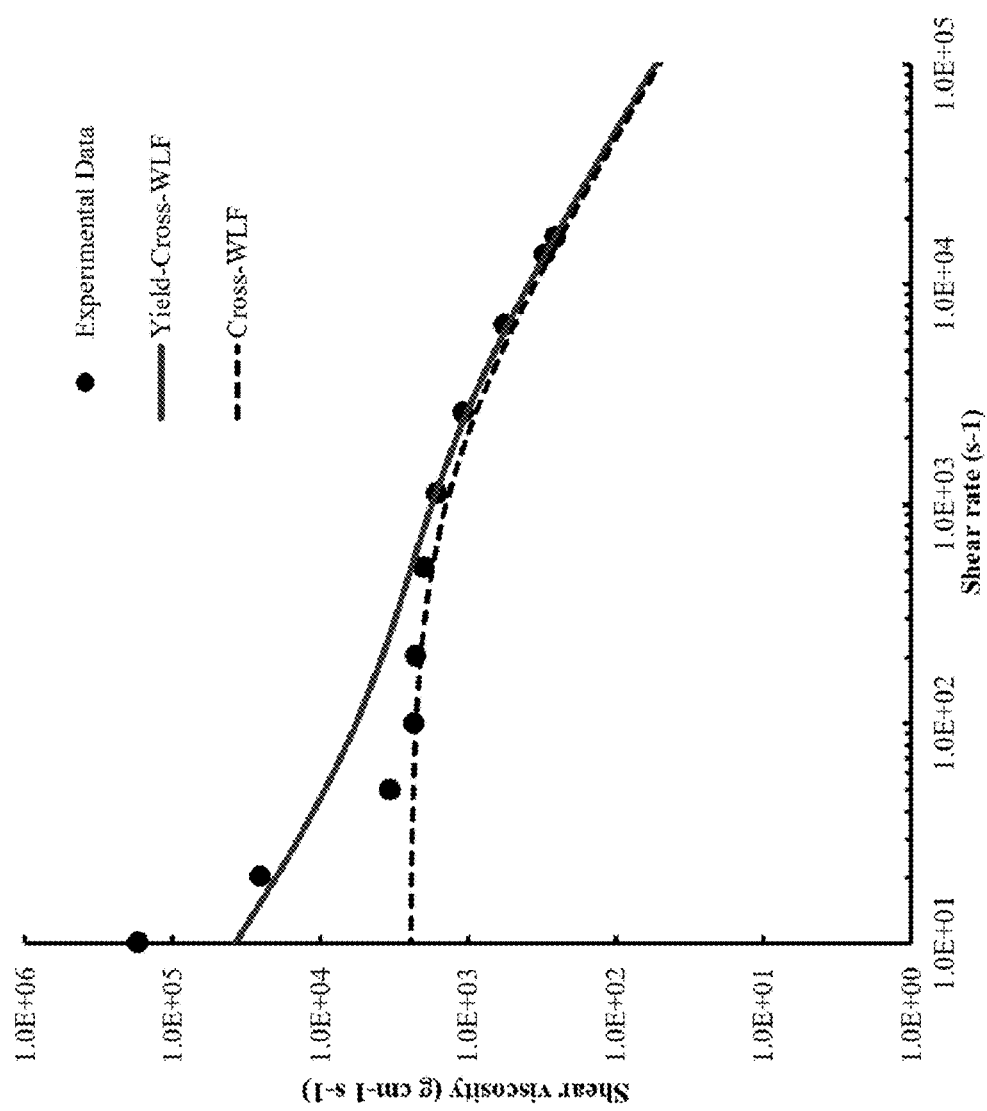
FIG. 9 shows the shear viscosity versus shear rate for the Yield-Cross-WLF model.

FIG. 9 shows the shear viscosity versus shear rate for the Yield-Cross-WLF model. As shown in FIG. 9, the Yield-Cross-WLF model is able to roughly fit yield-stress viscosity at low shear rates and accurately describe the high-shear-rate shear thinning slope, as compared with experimental data of Chang, et al. (See, Chang R Y, Hsu C H, Chiu H S, Sun S P, Wang C C, Tseng H C. Computer-implemented method and non-transitory computer medium for calculating shrinkage of molding products. U.S. Pat. No. 8,768,662 B2; 2014). However, while the Cross-WLF model shows a good curve fitting for the high-shear-rate experimental data of shear thinning slope, it poorly matches the yield-stress viscosity.

Figure 10:
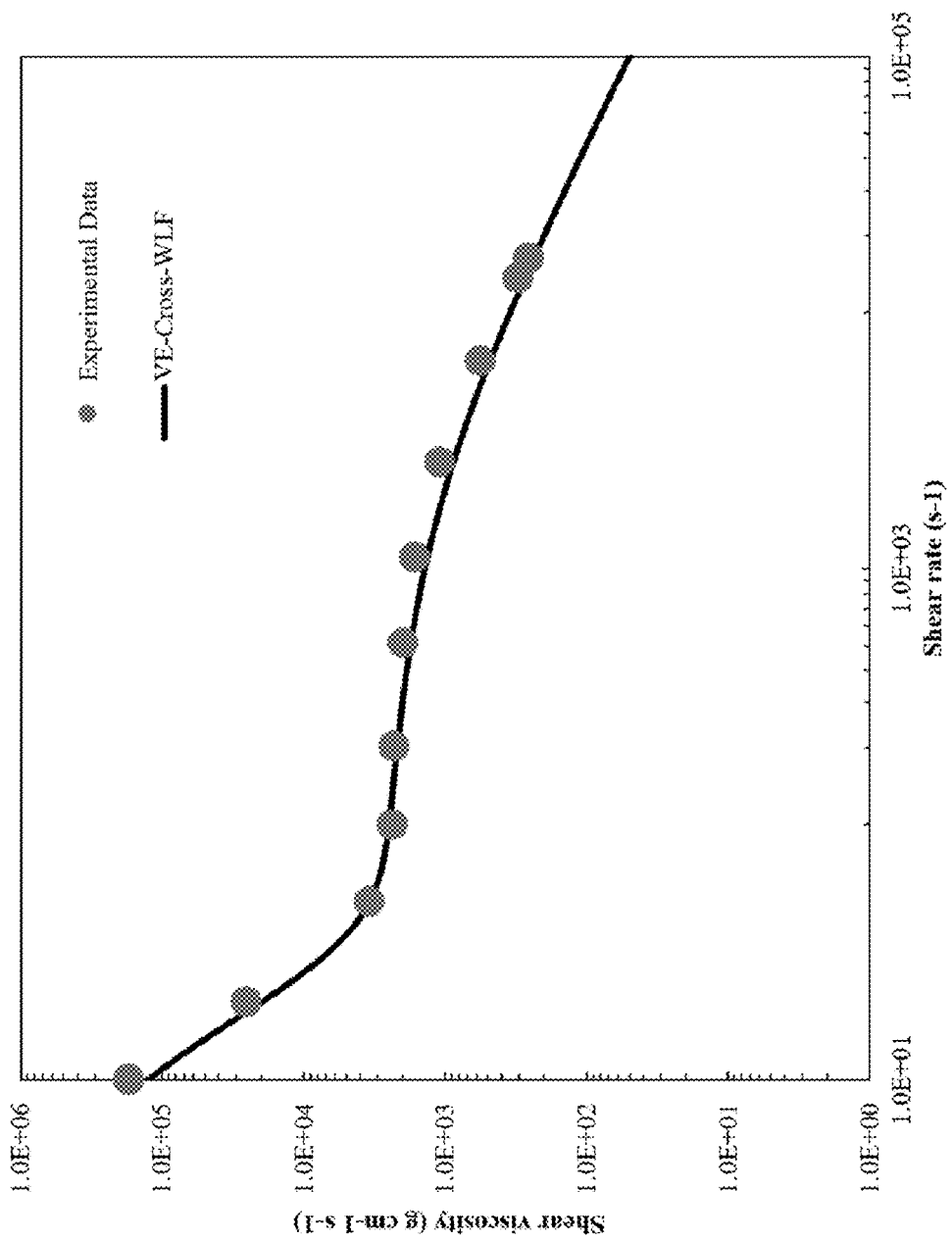
FIG. 10 shows the shear viscosity versus shear rate for the VE-Cross-WLF model.

FIG. 10 shows the shear viscosity versus shear rate for the VE-Cross-WLF model. In addition, Chang, et al. (See, Chang R Y, Hsu C H, Chiu H S, Sun S P, Wang C C, Tseng H C. Computer-implemented method and non-transitory computer medium for calculating shrinkage of molding products. U.S. Pat. No. 8,768,662 B2; 2014) developed the modified Cross-WLF model to completely describe the viscosity flow curve, including the low-shear-rate shear thinning slope (i.e., as yield-stress viscosity), the Newtonian viscosity plateau, and the high-shear-rate shear thinning slope, as shown in FIG. 10. They proposed the so-called viscoelastic (VE) characteristic term, $\eta_0^{VE}(T,P,\dot{\gamma})$, to replace the zero-shear-rate viscosity, $\eta_0(T,P)$, of the Cross-WLF viscosity model. The modified Cross-WLF model is known as the VE-Cross-WLF model:

$$\eta(\dot{\gamma}, T, P) = \frac{\eta_0^{VE}}{1 + \left(\frac{\eta_0^{VE} \dot{\gamma}}{\tau^*}\right)^{1-n}} \quad (12)$$

$$\eta_0^{VE}(T, P, \dot{\gamma}) = \eta_0(T, P)\eta^{VE}(P, \dot{\gamma}) \quad (13)$$

$$\eta_0 = D_1 \exp\left(\frac{-A_1(T - T_c)}{A_2 + (T - T_c)}\right) \quad (14)$$

$$T_c = D_2 + D_3 P \text{ and } A_2 = \tilde{A}_2 + D_3 P \quad (15)$$

$$\eta^{VE}(P, \dot{\gamma}) = \exp(b(\dot{\gamma})P) \quad (16)$$

$$b(\dot{\gamma}) = \sum_{n=1}^{N} c_n \exp(-\dot{\gamma}/t_n) \quad (17)$$

Note that the viscosity $\eta_0^{VE}$'s parameters, $c_n$ and $t_n$, are fitted by experimental data. The VE-Cross-WLF model can provide a good three-region curve fitting at the same time, as shown in FIG. 10. This result proves that the VE zero-shear-rate viscosity term, $\eta_0^{VE}(T,P,\dot{\gamma})$, can surely dominate the low-shear-rate shear thinning viscosity. However, the VE-Cross-WLF model is not practical in use due to complex mathematical equations and less physical meaning.

Figure 11:
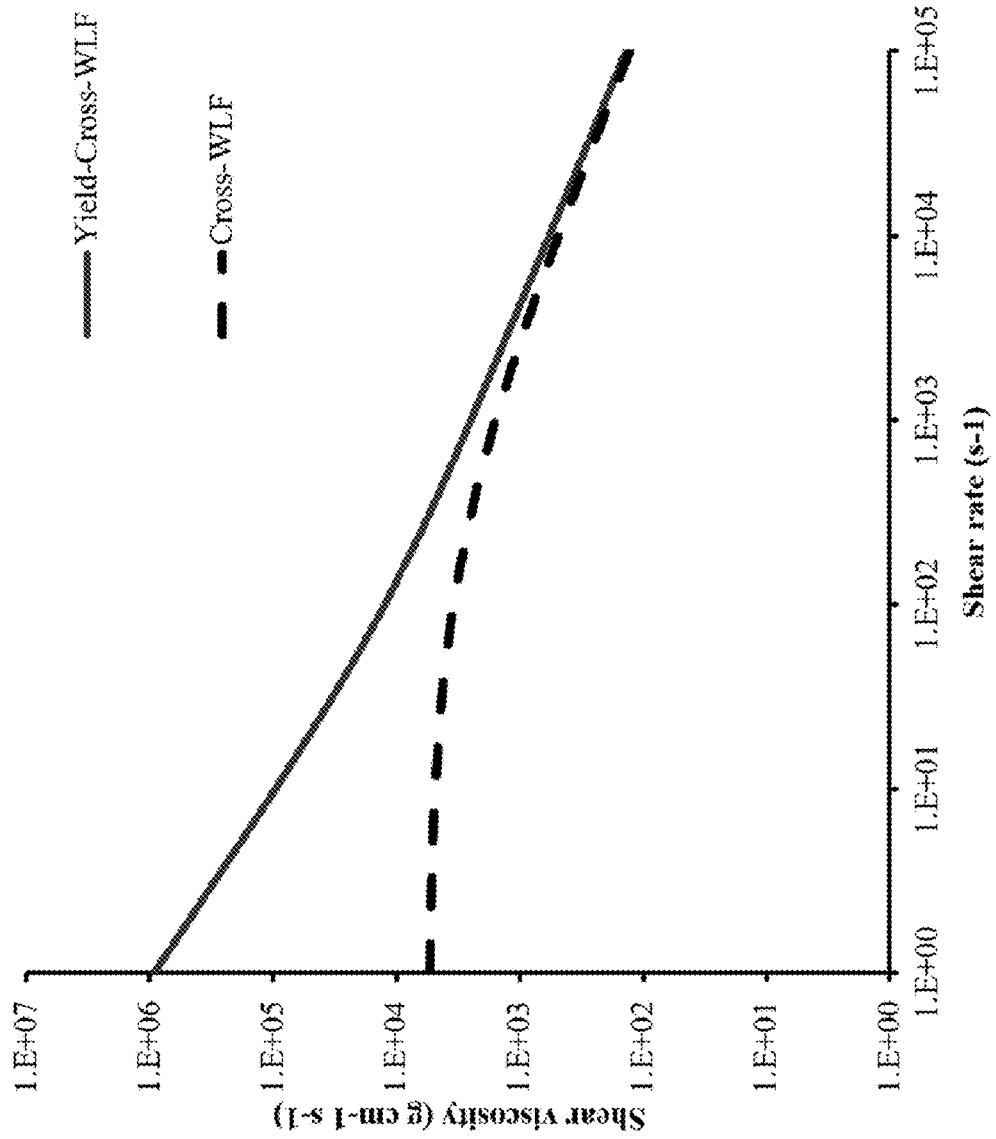
FIG. 11 shows the viscosity flow curve with respect to shear rate for the Cross-WLF and the Yield-Cross-WLF model.
Figure 12:
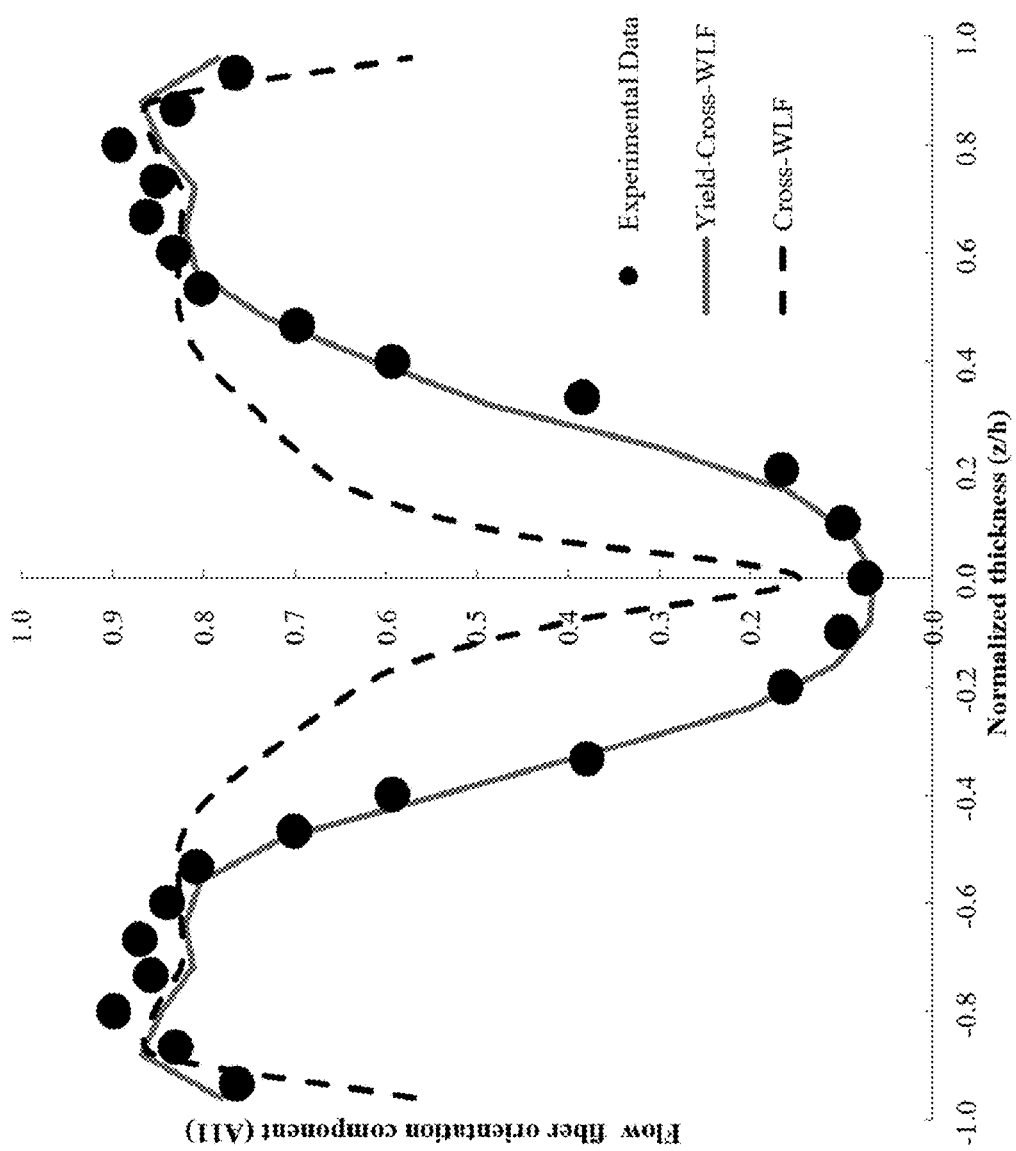
FIG. 12 shows the predicted and experimental fiber orientation distributions across the thickness of the molded part.

FIG. 11 shows the viscosity flow curve with respect to shear rate for the Cross-WLF and the Yield-Cross-WLF model; note that the yield stress viscosity is strong at low shear rates. FIG. 12 shows the predicted and experimental fiber orientation distributions across the thickness of the molded part. As shown in FIG. 12, the predicted fiber orientation distribution for the Yield-Cross-WLF model shows strong agreement with the measurements, especially for the core region, as well as improvement over previous simulation attempts for the Cross-WLF model.

Based on the previous inventions of Tseng, et al. (See, Tseng H-C, Chang R-Y, Hsu C-H. Improved fiber orientation predictions for injection molded fiber composites. Composites Part A: Applied Science and Manufacturing 2017; 99 65-75. And Tseng H-C, Chang R-Y, Hsu C-H. Method for preparing a fiber-reinforced composite article by using computer-aided engineering. U.S. Pat. No. 9,573,307B1; 2017.) and Chang, et al. (See, Chang R Y, Hsu C H, Chiu H S, Sun S P, Wang C C, Tseng H C. Computer-implemented method and non-transitory computer medium for calculating shrinkage of molding products. U.S. Pat. No. 8,768,662 B2; 2014), here we propose a new modified Cross-WLF model of the effect of pressure on viscosity, in particular on the yield stress viscosity at low shear rates, to improve the prediction of the fiber orientation distribution's core width. According to the standard Cross-WLF model, the parameter D3 serves to control the pressure effect, as shown in Eq. (7) and (8). The viscosity increases with increasing D3.

Figure 13:
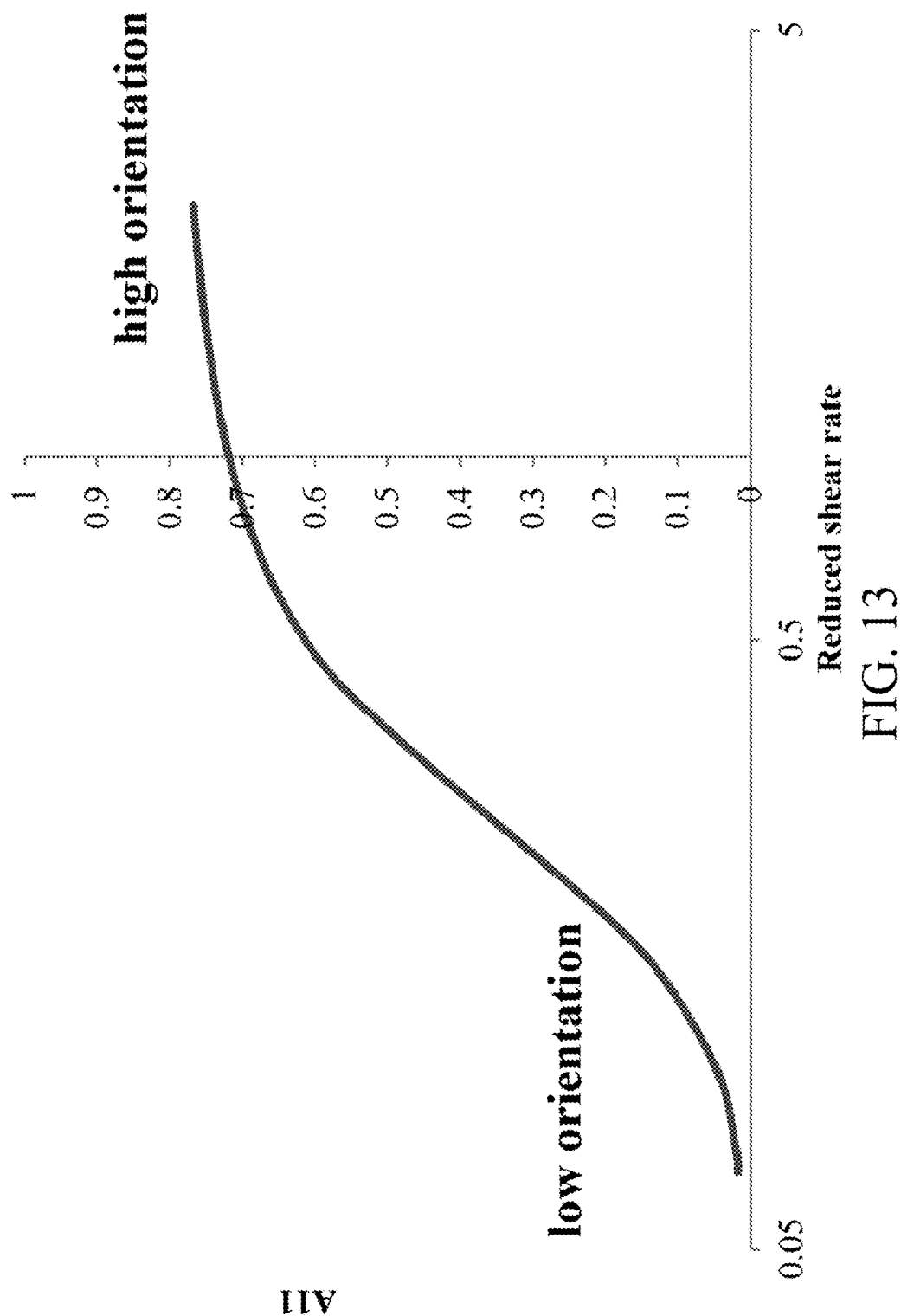
FIG. 13 shows the flow-direction orientation component (A11) versus the reduced shear rate.
Figure 14:
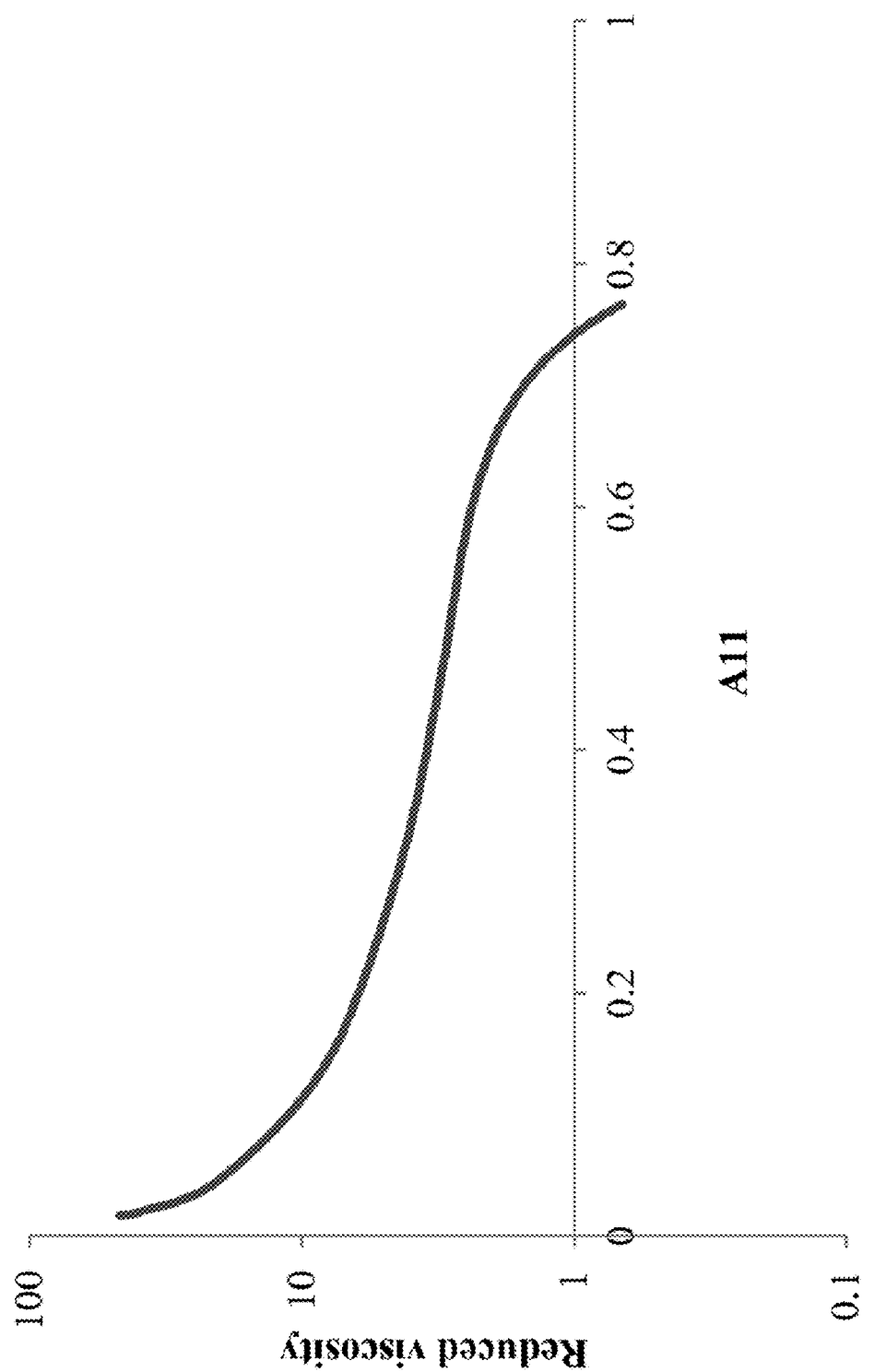
FIG. 14 shows the reduced viscosity versus the flow-direction orientation component (A11).

FIG. 13 shows the flow-direction orientation component (A11) versus the reduced shear rate, and FIG. 14 shows the reduced viscosity versus the flow-direction orientation component (A11). As shown in FIG. 13 and FIG. 14, the degree of fiber orientation along flow direction is increased with increasing shear rates from isotropic state and low fiber alignment to high fiber alignment (FIG. 13). In addition, the viscosity is higher at low orientations or isotropic states, whereas the lower viscosity is found at high orientations (FIG. 14).

In general, D3 is always constant, while the viscosity is increased with D3. Therefore, we assume that D3 should be related to shear rate due to fiber orientation states. At low shear rates with isotropic states, a higher yield-stress viscosity should be expected with greater values of the parameter D3. Correspondingly, a lower shear-thinning viscosity is predicted for smaller values of D3. According to the general understanding, we can deduce that D3 is increased with increasing shear rate. The relationship between D3 and shear rate is given in FIG. 15.

Figure 15:
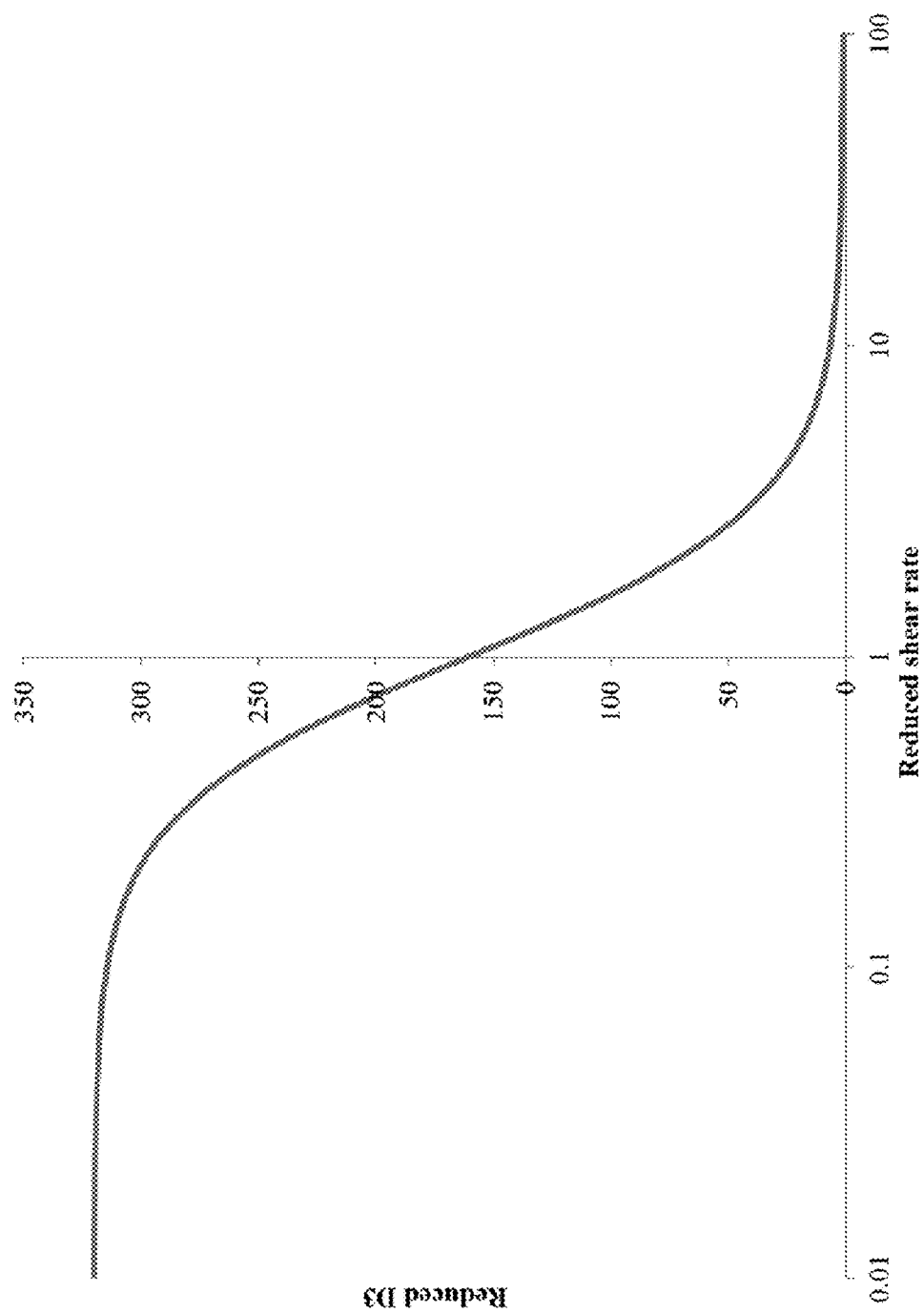
FIG. 15 shows the reduced shear-rate dependent pressure parameter (D3) versus the reduced shear rate.

According to the physical meaning logic above, a mathematical model, shear-rate dependent pressure parameter, is given as:

$$D_3(\dot{\gamma}) = D_3^0 \left( 1 + \frac{N_3 - 1}{1 + \left(\frac{\dot{\gamma}}{\dot{\gamma}_c}\right)^{n_3}} \right), \quad (18)$$

$$D_3^* = 1 + \frac{N_3 - 1}{1 + (\dot{\gamma}^*)^{n_3}}, \quad (19)$$

$$D_3^* = \frac{D_3}{D_3^0}, \dot{\gamma}^* = \frac{\dot{\gamma}}{\dot{\gamma}_c}, \quad (20)$$

where the available parameters $D_3^0$, $\dot{\gamma}_c$, $N_3$ and $n_3$ are fitting constants of the experimental data, $D_3^*$ represents the reduced pressure parameter, and $\dot{\gamma}^*$ represents the reduced shear rate. In FIG. 15, the relationship between the reduced pressure parameter and the reduced shear rate is given by the parameters: $N_3$=320, $n_3$=1.75 and $\dot{\gamma}_c$=10 s$^{-1}$.

Figure 16:
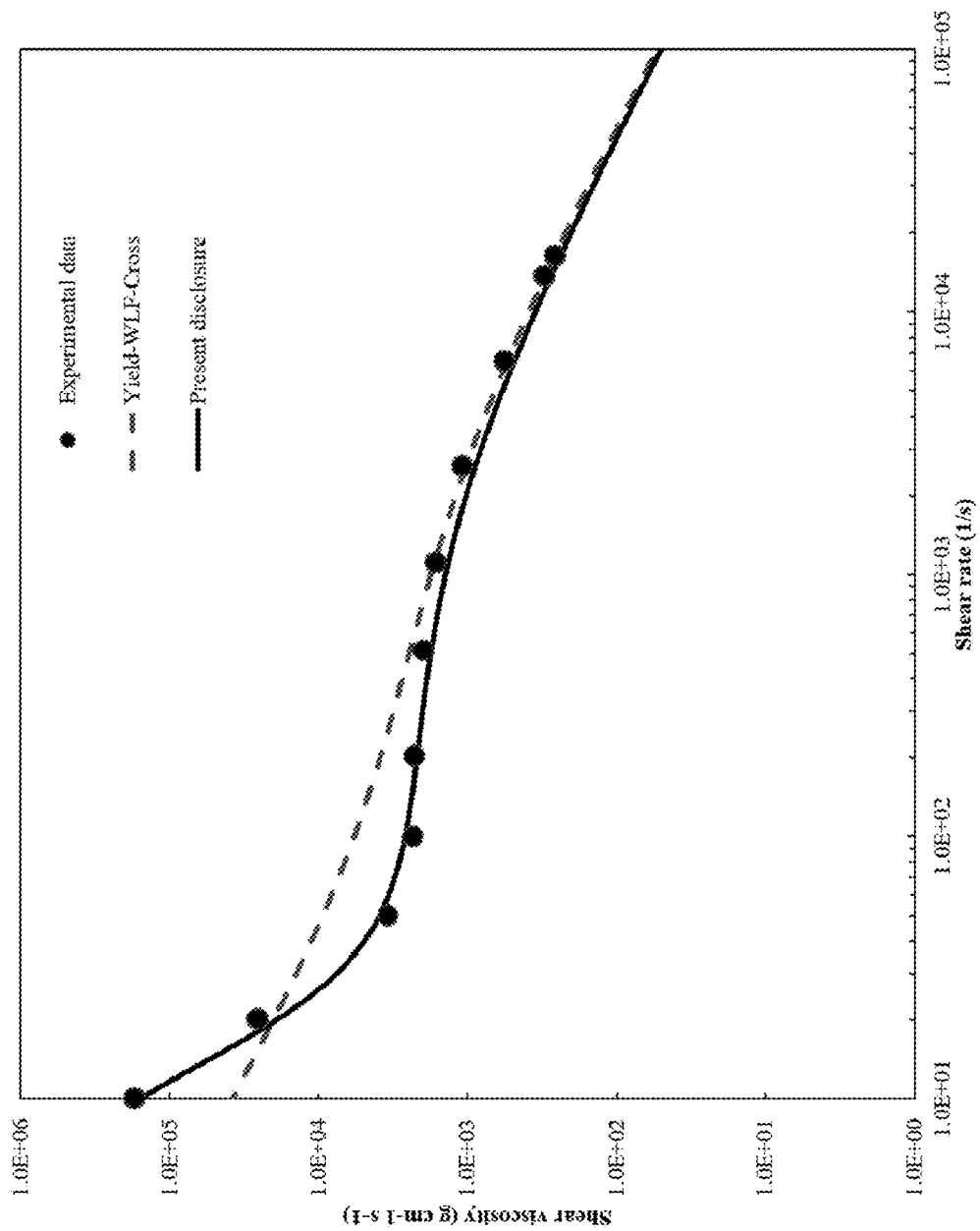
FIG. 16 shows the shear viscosity versus shear rate for the Yield-WLF-Cross model, the present model and the experiment data.

Therefore, the shear-rate dependent pressure parameter expression $D_3(\dot{\gamma})$ of Eq. (18) is coupled to the Cross-WLF viscosity of Eq. (5). Based on the previous experimental data, the Cross-WLF model with $D_3(\dot{\gamma})$ can complete the viscosity curve, including the low-shear-rate yield-stress viscosity, the Newtonian viscosity, and the high-shear-rate shear thinning viscosity, as shown in FIG. 16. In addition, the present invention is superior to the previous invention of the Yield-Cross-WLF model for fitting the low-shear-rate viscosity.

Figure 17:
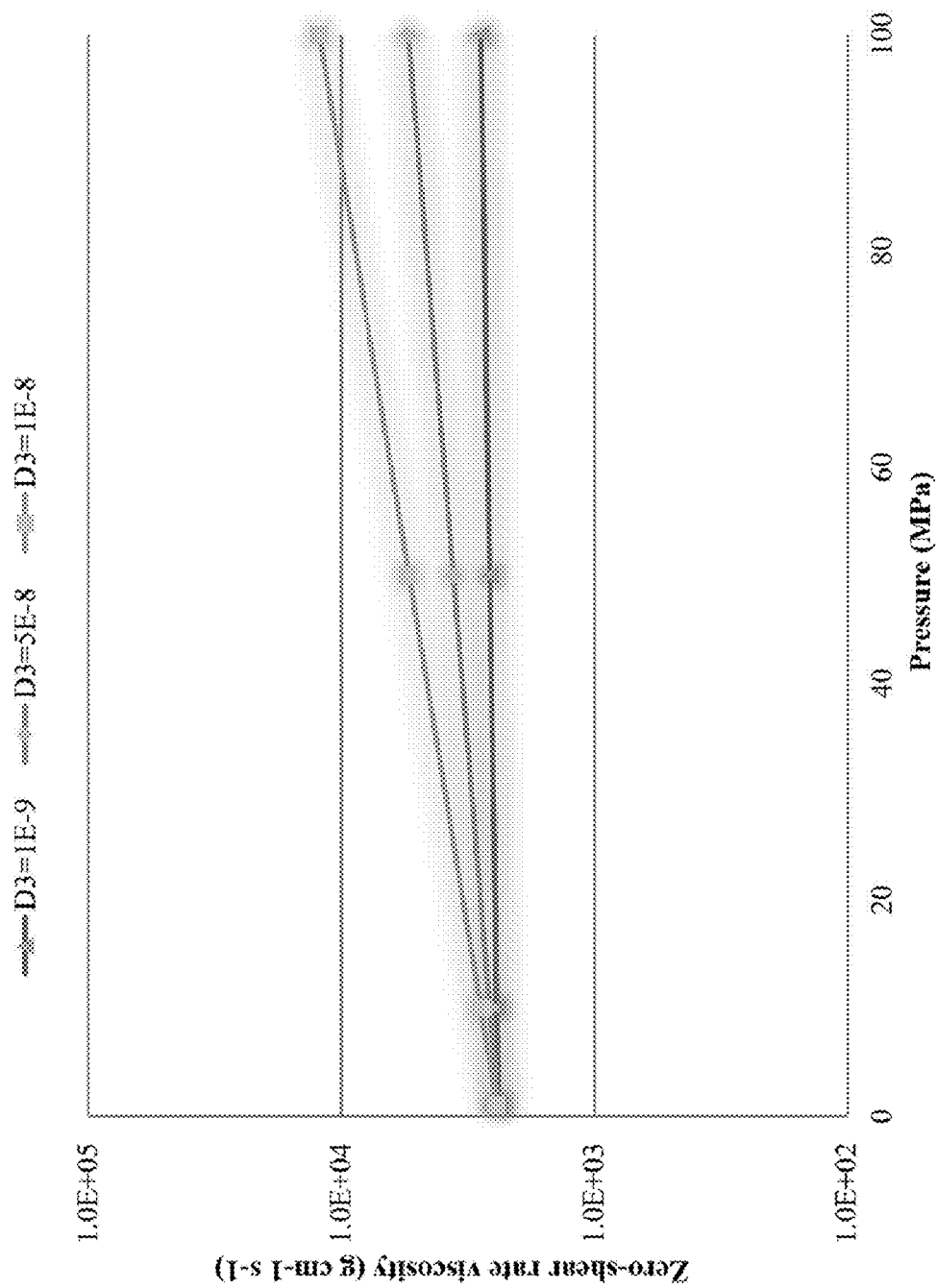
FIG. 17 shows the variation of the zero-shear-rate viscosity of the composite molding material with respect to the molding pressure and the shear rate.
Figure 18:
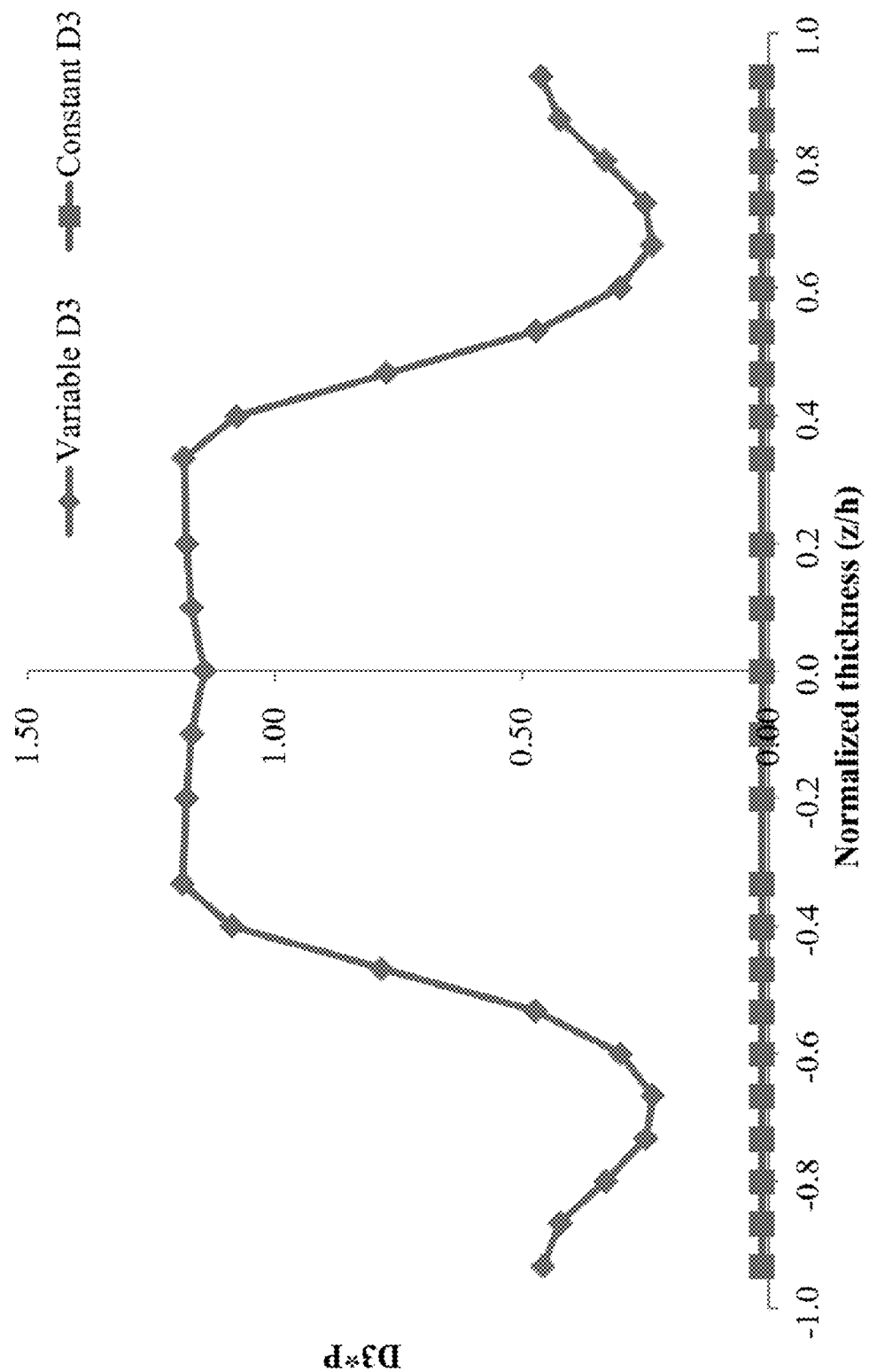
FIG. 18 shows the non-linear multiplying effect of the shear rate on the molding pressure (D3*P) across the thickness of the molded part.
Figure 19:
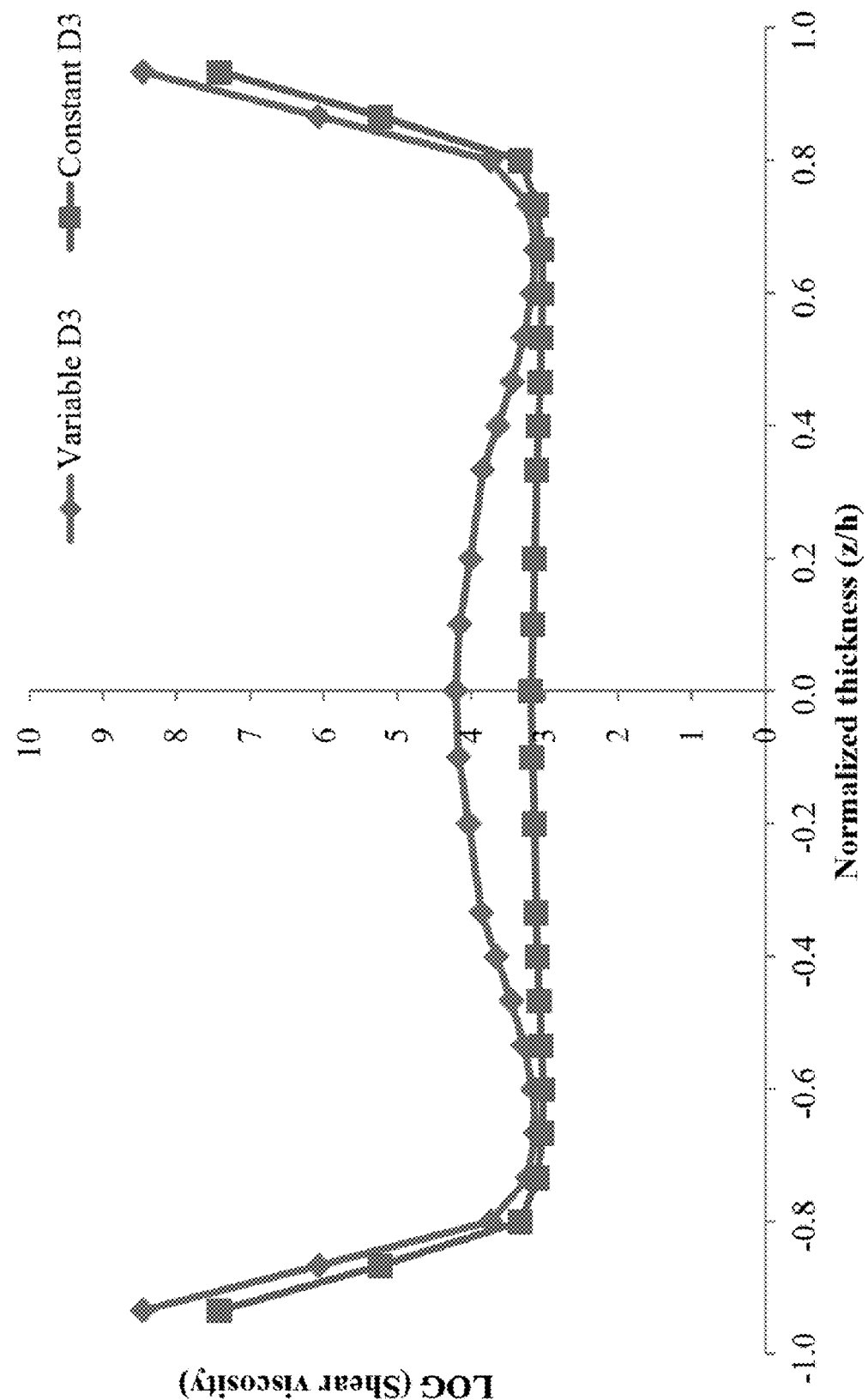
FIG. 19 shows the combined effect of the molding pressure and the shear rate on the zero-shear-rate viscosity of the composite molding material.

FIG. 17 shows the variation of the zero-shear-rate viscosity of the composite molding material with respect to the molding pressure and the shear rate, FIG. 18 shows the non-linear multiplying effect of the shear rate on the molding pressure (D3*P) across the thickness of the molded part, and FIG. 19 shows the combined effect of the molding pressure and the shear rate on the zero-shear-rate viscosity of the composite molding material. As shown in FIG. 18 and FIG. 19, the combined effect is non-linear along the thickness direction, which is perpendicular to the flow direction of the composite molding resin in the mold cavity.

Figure 20:
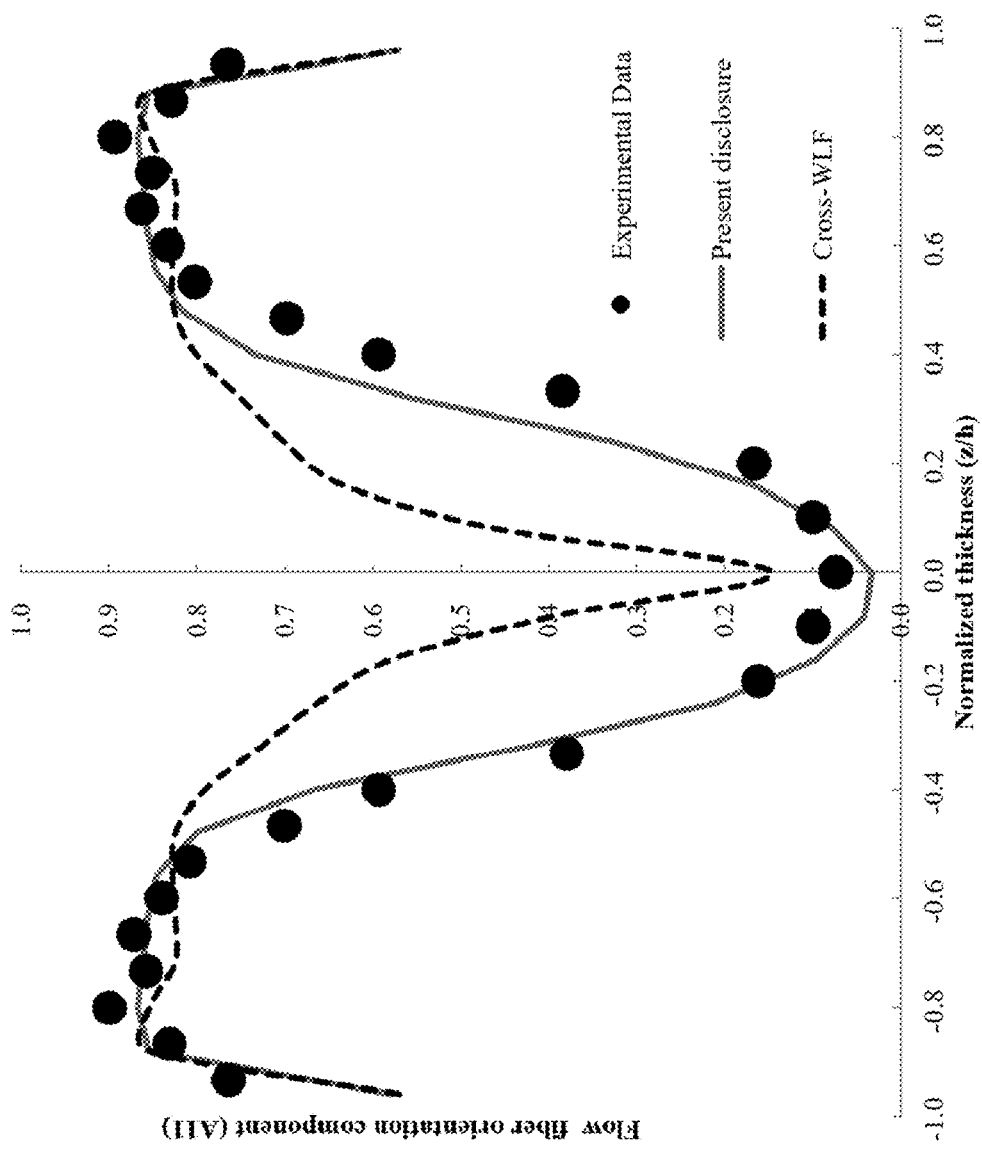
FIG. 20 shows the predicted and experimental fiber orientation distributions across the thickness of the molded part.
Figure 21:
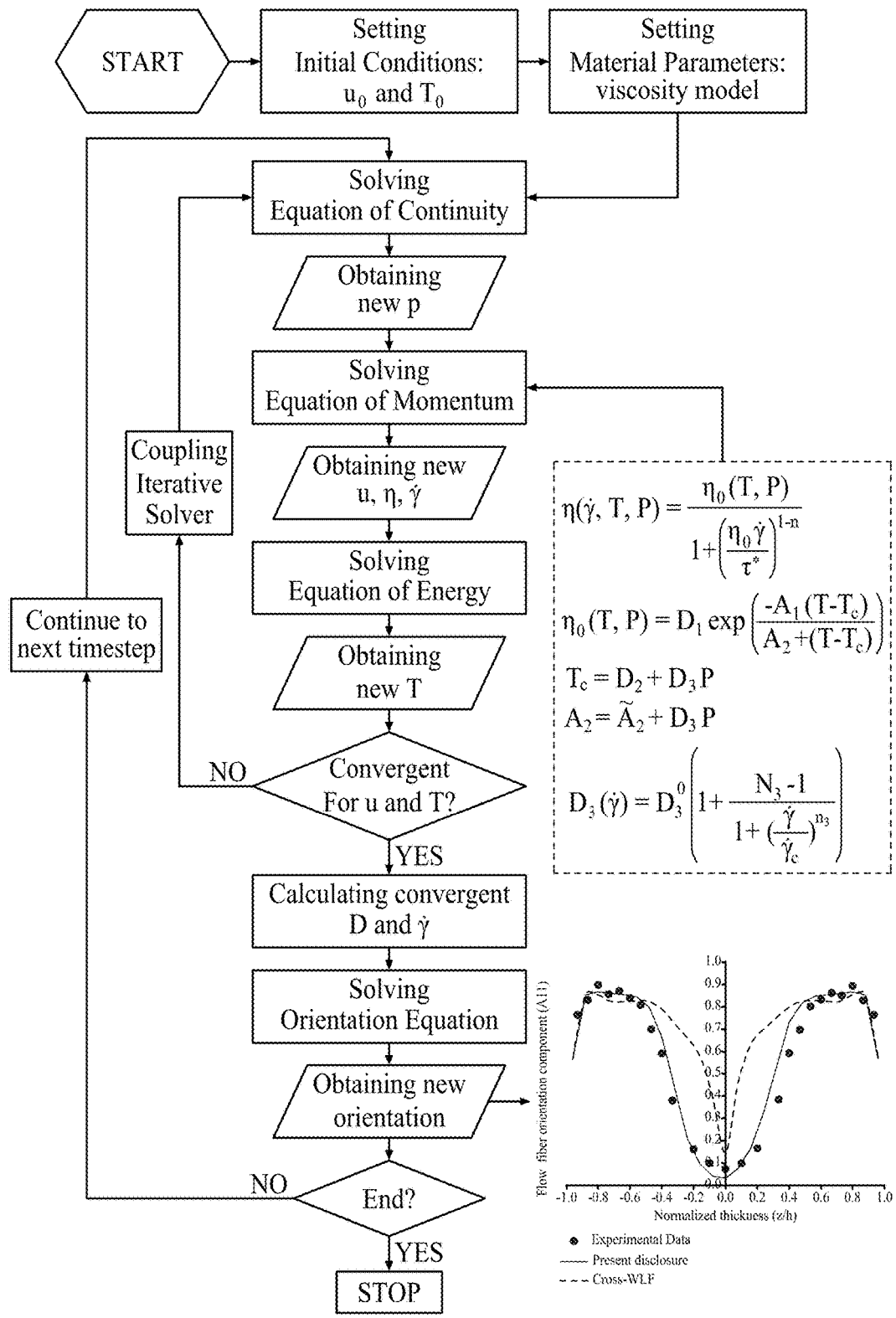
FIG. 21 is a flowchart showing an integration of the fiber orientation prediction technique and the CAE software in accordance with some embodiments of the present disclosure.

FIG. 20 shows the predicted and experimental fiber orientation distributions across the thickness of the molded part, and FIG. 21 is a flowchart showing an integration of the fiber orientation prediction technique and the CAE software in accordance with some embodiments of the present disclosure. As shown in FIG. 20, the fiber orientation prediction is excellent, especially for the core region, as compared with experimental data. Accordingly, we can determine the optimal parameters of the shear-rate dependent pressure parameter expression to get accurate orientation predictions.

The CAE software for injection molding can offer a velocity gradient tensor in the filling flow field for the subsequent fiber-orientation analysis (See, U.S. Pat. No. 9,862,133 B1; the entirety of which is incorporated herein by reference). Thus, the orientation analysis is able to determine an acceptable orientation tensor. It is important that the constitutive equation for fibers obtains the orientation tensor to calculate the fiber suspension stress tensor. In the next step, this stress tensor is returned to the CAE software for updating. Therefore, in future work, the embodiment of the fiber orientation program will play an important role and is helpful in present CAE development of injection molding for fiber reinforced composites.

The mechanical properties of the molded article is correlated with the orientation distribution of the fibers. If the simulated orientation distribution of the fibers with the corresponding mechanical properties does not meet the specification of the molded FRT article, the fiber parameters and/or the molding condition may be adjusted, and another simulation is performed to obtain an updated orientation distribution of the fibers in the composite molding resin while using the adjusted fiber parameter and/or the molding condition. To obtain the orientation distribution of the fibers in the composite molding resin injected into the model cavity, the present disclosure generates the rotary diffusion distribution of the fibers based on the previous orientation distribution of the fibers, and generates the updated orientation distribution of the fibers based on the rotary diffusion distribution of the fibers. Consequently, the present disclosure can accurately and efficiently predict the orientation distribution of the fibers in the composite molding resin and the mechanical properties of the molded FRT article.

One aspect of the present disclosure provides a molding system for preparing an injection-molded fiber-reinforced composite article. In some embodiments, the molding system comprises: a mold having a mold cavity; a molding machine configured to fill the mold cavity with a composite molding resin including a polymeric material having a plurality of fibers; a processing module connected to the molding machine, wherein the processing module is configured to generate an orientation distribution of the fibers in the mold cavity based on a molding condition for the molding machine, wherein the orientation distribution is generated taking into consideration a combined effect of a molding pressure and a shear rate on a zero-shear-rate viscosity of the composite molding material; and a controller connected to the processing module and configured to control the molding machine with the molding condition to perform an actual molding for injecting the composite molding resin into at least a portion of the mold cavity.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, and steps.

What is claimed is:

1. A molding system for preparing an injection-molded fiber-reinforced composite article, comprising:
   - a mold having a mold cavity;
   - a molding machine configured to fill the mold cavity with a composite molding resin including a polymeric material having a plurality of fibers;
   - a processing module connected to the molding machine, wherein the processing module is configured to generate an orientation distribution of the fibers in the mold cavity based on a molding condition for the molding machine, wherein the orientation distribution is generated taking into consideration a combined effect of a molding pressure and a shear rate on a zero-shear-rate viscosity of the composite molding material; and
   - a controller connected to the processing module and configured to control the molding machine with the molding condition to perform an actual molding for injecting the composite molding resin into at least a portion of the mold cavity.

2. The molding system of claim 1, wherein the combined effect includes a non-linear multiplying effect of the shear rate on the molding pressure.

3. The molding system of claim 1, wherein the combined effect is non-linear along a direction perpendicular to a flow direction of the composite molding resin in the mold cavity.

4. The molding system of claim 1, wherein the combined effect is represented using an expression:

$$\eta_0(T, P, \dot{\gamma}) = D_1 \exp\left(\frac{A_1 D_2 - A_1 T}{\tilde{A}_2 - D_2 + T}\right) \exp\left(\frac{A_1}{\tilde{A}_2 - D_2 + T} D_3(\dot{\gamma}) P\right)$$

where $\eta_0(T,P,\dot{\gamma})$ represents zero-shear-rate viscosity, $\dot{\gamma}$ represents shear rate, P represents molding pressure, T represents molding temperature, $A_1$, $A_2$, $D_1$, $D_2$, $\tilde{A}_2$ represent constants, and $D_3(\dot{\gamma})$ represents a variable depending on the shear rate.

5. The molding system of claim 4, wherein the $D_3(\dot{\gamma})$ is represented using an expression:

$$D_3(\dot{\gamma}) = D_3^0\left(1 + \frac{N_3 - 1}{1 + \left(\frac{\dot{\gamma}}{\dot{\gamma}_c}\right)^{n_3}}\right),$$

$$D_3^* = 1 + \frac{N_3 - 1}{1 + (\dot{\gamma}^*)^{n_3}},$$

$$D_3^* = \frac{D_3}{D_3^0}, \dot{\gamma}^* = \frac{\dot{\gamma}}{\dot{\gamma}_c},$$

where $D_3^0$, $\dot{\gamma}_c$, $N_3$ and $n_3$ represent constants; $D_3^*$ represents a reduced pressure parameter, and $\dot{\gamma}^*$ represents a reduced shear rate.

* * * * *